US012439225B2

(12) United States Patent
Koprowski et al.

(10) Patent No.: US 12,439,225 B2
(45) Date of Patent: Oct. 7, 2025

(54) COORDINATION OF BEACON SIGNAL SCANNING IN AN OBJECT TRACKING SYSTEM

(71) Applicant: CHORUSVIEW, INC., Las Vegas, NV (US)

(72) Inventors: Brion Koprowski, Boulder, CO (US); Patrick Briggs, Austin, TX (US)

(73) Assignee: CHORUSVIEW, INC., Las Vegas, NV (US)

( * ) Notice: Subject to any disclaimer, the term of this patent is extended or adjusted under 35 U.S.C. 154(b) by 421 days.

(21) Appl. No.: 17/980,145

(22) Filed: Nov. 3, 2022

(65) Prior Publication Data

US 2024/0155307 A1     May 9, 2024

(51) Int. Cl.
*H04W 4/029*     (2018.01)
*H04W 4/02*     (2018.01)

(52) U.S. Cl.
CPC ........... *H04W 4/029* (2018.02); *H04W 4/027* (2013.01)

(58) Field of Classification Search
CPC ..... H04W 4/029; H04W 4/027; H04W 4/026; H04W 4/35; H04W 4/80; H04W 4/02; H04W 4/021; H04W 64/00; H04W 4/38; H04W 24/02; H04W 12/63; H04W 4/025; H04W 52/0229; H04W 64/003; H04W 12/64; H04W 52/0235; H04W 52/02; H04W 48/04; H04W 52/0245; H04W 52/0251; H04W 40/20; H04W 40/244; H04W 60/04; H04W 36/322;

(Continued)

(56) References Cited

U.S. PATENT DOCUMENTS 7,385,554 B2    6/2008    Zimmerman et al.
9,900,061 B1 *   2/2018    Lui .................... G06K 7/10009

(Continued)

FOREIGN PATENT DOCUMENTS

| KR | 20160066010 A | 6/2016 |
|---|---|---|
| KR | 20180019617 A | 2/2018 |
| WO | 2016059930 A1 | 4/2016 |

OTHER PUBLICATIONS

International Search Report and Written Opinion for International Application No. PCT/US2023/036389 dated Feb. 27, 2024 (13 pages).

*Primary Examiner* — Diane D Mizrahi
*Assistant Examiner* — Jing Gao
(74) *Attorney, Agent, or Firm* — Botos Churchill IP Law LLP

(57) ABSTRACT

A method of coordinating beacon signal scanning of reader devices in a tracking system is provided. For instance, first information may be received from a first reader device of the tracking system, and second information may be received from a second reader device, of the tracking system. Based on the first information or the second information that one of the first reader device or the second reader device has moved may be determined. In response to the determination that one of the first reader device or the second reader device has moved, a first coordinated duty cycle for the first reader device and a second coordinated duty cycle for the second reader device may be determined. The first coordinated duty cycle may be provided to the first reader device, and the second coordinated duty cycle may be provided to the second reader device.

20 Claims, 17 Drawing Sheets

(58) Field of Classification Search
CPC .. H04W 56/0015; H04L 67/60; H04L 67/125; H04L 67/52; H04L 67/535
See application file for complete search history.

(56) References Cited

U.S. PATENT DOCUMENTS

| | | |
|---|---|---|
| 11,032,871 B2 | 6/2021 | Amin et al. |
| 2006/0255935 A1 | 11/2006 | Scalisi et al. |
| 2007/0001813 A1 | 1/2007 | Maguire et al. |
| 2016/0066137 A1 | 3/2016 | Kulkarni et al. |
| 2018/0300671 A1* | 10/2018 | Richardson ............ G06Q 10/08 |
| 2019/0289425 A1* | 9/2019 | Soro ................ H04W 72/0453 |
| 2020/0380326 A1 | 12/2020 | Kawaguchi et al. |
| 2021/0185485 A1 | 6/2021 | Deixler et al. |

* cited by examiner

100

200

400

420

COORDINATION OF BEACON SIGNAL SCANNING IN AN OBJECT TRACKING SYSTEM

BACKGROUND

The Internet of Things (IoT) is the inter-networking of physical objects, such as products, packages, vehicles, buildings, etc., that are embedded with electronic components for network connectivity. The embedded components enable objects to detect other objects, be detected by other objects, collect data and/or transmit data. In some examples, the embedded components may include tags or labels attached to the physical objects. These tags or labels may be passive or active. The inter-networking capabilities may be leveraged for tracking locations of physical objects. In many situations, objects may be moved at different points in time, such as a package or equipment moved from a truck to a loading dock to a warehouse, or medical equipment that is moved between different rooms (or floors) in a hospital. These types of situations can be very challenging to determine the location of the object with suitable accuracy, including updating of the location as it changes. In addition, systems that use GPS, WiFi, or LTE may suffer from signal dropout or transmitters going offline, which can reduce the ability to properly identify an object's location.

BRIEF SUMMARY

One aspect of the disclosure provides a method of coordinating beacon signal scanning of reader devices in a tracking system. The method includes receiving, by one or more processors of one or more server computing devices, first information from a first reader device of the tracking system; receiving, by the one or more processors, second information from a second reader device of the tracking system; determining, by the one or more processors, based on the first information or the second information that one of the first reader device or the second reader device has moved; in response to the determination that the first reader device or the second reader device has moved, determining, by the one or more processors, a first coordinated duty cycle for the first reader device and a second coordinated duty cycle for the second reader device; and providing, by the one or more server computing devices, the first coordinated duty cycle to the first reader device and the second coordinated duty cycle to the second reader device.

In one example, the first coordinated duty cycle for the first reader device and the second coordinated duty cycle for the second reader device have scanning times which do not overlap. In another example, the first coordinated duty cycle for the first reader device is configured to reduce power consumption at the first reader device and the second coordinated duty cycle for the second reader device is configured to reduce power consumption at the second reader device. In another example, the first coordinated duty cycle for the first reader device reduces a scanning time of the first reader device, and the second coordinated duty cycle for the second reader device reduces a scanning time of the second reader device. In another example, the first information or the second information indicates a next transmission time of a tracking tag, and wherein determining the first coordinated duty cycle for the first reader device and the second coordinated duty cycle for the second reader device is further based on the next transmission time. In another example, the first information further includes information about motion of the first reader device, and wherein determining the first coordinated duty cycle for the first reader device and the second coordinated duty cycle for the second reader device is further based on the motion. In another example, the method also includes using the first information and the second information to determine that a tracking tag has moved, and determining the first coordinated duty cycle for the first reader device and the second coordinated duty cycle for the second reader device is further based on the determination that the tracking tag has moved. In another example, the method also includes using the first information and the second information to determine that a tracking tag is moving in a particular direction, and wherein determining the first coordinated duty cycle for the first reader device and the second coordinated duty cycle for the second reader device is further based on the particular direction. In another example, the method also includes determining, by the one or more processors, a third coordinated duty cycle for a third reader device in conjunction with the determining of the first coordinated duty cycle and the second coordinated duty cycle.

Another aspect of the disclosure provides a system for coordinating beacon signal scanning of reader devices in a tracking system. The system includes one or more server computing devices having one or more processors configured to: receive first information from a first reader device of the tracking system; receive second information from a second reader device of the tracking system; determine based on the first information or the second information that one of the first reader device or the second reader device has moved; in response to the determination that the first reader device or the second reader device has moved, determine a first coordinated duty cycle for the first reader device and a second coordinated duty cycle for the second reader device; and provide the first coordinated duty cycle to the first reader device and the second coordinated duty cycle to the second reader device.

In one example, the method also includes the first reader device and the second reader device. In another example, the first coordinated duty cycle for the first reader device and the second coordinated duty cycle for the second reader device have scanning times which do not overlap. In another example, the first coordinated duty cycle for the first reader device is configured to reduce power consumption at the first reader device and the second coordinated duty cycle for the second reader device is configured to reduce power consumption at the second reader device. In another example, the first coordinated duty cycle for the first reader device reduces a scanning time of the first reader device, and the second coordinated duty cycle for the second reader device reduces a scanning time of the second reader device. In another example, the first information or the second information indicates a next transmission time of a tracking tag, and wherein the one or more processors are further configured to determine the first coordinated duty cycle for the first reader device and the second coordinated duty cycle for the second reader device further based on the next transmission time. In this example, the system also includes the tracking tag. In another example, the first information further includes information about motion of the first reader device, and wherein the one or more processors are further configured to determine the first coordinated duty cycle for the first reader device and the second coordinated duty cycle for the second reader device further based on the motion. In another example, the one or more processors are further configured to use the first information and the second information to determine that a tracking tag has moved, and to determine the first coordinated duty cycle for the first reader device and the second coordinated duty cycle for the second reader device further based on the determination that the tracking tag has moved. In another example, the one or more processors are further configured to use the first information and the second information to determine that a tracking tag is moving in a particular direction, and to determine the first coordinated duty cycle for the first reader device and the second coordinated duty cycle for the second reader device further based on the particular direction. In another example, the one or more processors are further configured to determine a third coordinated duty cycle for a third reader device in conjunction with the determining of the first coordinated duty cycle and the second coordinated duty cycle.

DETAILED DESCRIPTION

Overview

Figure 1A:
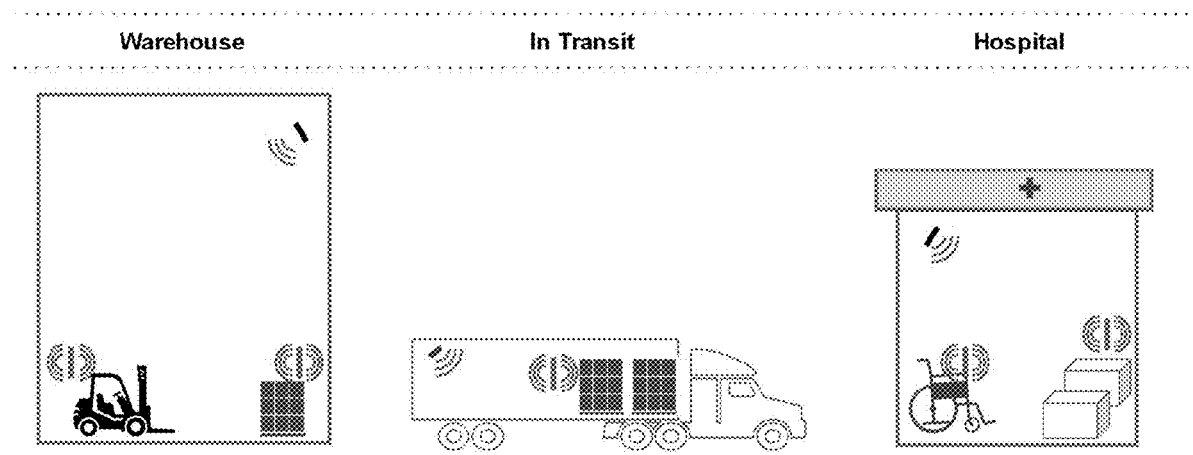
FIG. 1A illustrates various examples for localization of objects in accordance with aspects of the technology.

The technology relates to coordination of beacon signal scanning for reader devices used to localize and track objects. For example, some systems may involve tagging objects with tracking tags which periodically transmit beacon signals with identifying information for the objects. Reader devices may receive these beacon signals and provide information from the beacon signals to a backend or server computing device for analysis and tracking purposes. In this regard, such systems may allow for the tracking of objects (e.g., equipment, medical and other supplies, etc.). Because the reader devices are likely to be battery operated, continuous scanning for the beacon signals may not be possible or practical, thus lower duty cycles (e.g., 10 scans per second) may be used. However, these duty cycles as well as scanning durations and scanning times (e.g., start time) may be somewhat random, especially in a system which uses various different types of reader devices (e.g., hand-held scanning devices, tablets, cell phones, etc.). In some instances, there may be multiple reader devices in range of a beacon and the scanning time of each reader device could overlap significantly. This can duplicate data and reduce the effective scan duty cycle possible with multiple readers.

To address these shortcomings, a federated beacon scanning approach may be used. Such approaches may involve reader device to reader device to reader device coordination, coordination orchestrated by the aforementioned server computing devices, or a hybrid approach.

In one reader device to reader device approach, two reader devices may be within range of one another or rather able to receive signals from one another. In such situations, the reader devices may broadcast a first signal identifying whether that reader device has been moved. If so, other reader devices within range of the reading device that has moved may communicate with one another in order to coordinate one or more of their duty cycles, scanning durations, and scanning times.

In another reader device to reader device approach, two reader devices may be scanning and receiving beacon signals from the same tracking tag. In such situations, the reader devices may broadcast a second signal identifying which tracking tags are being received at that reader device. In this way, other reader devices nearby may determine if they are also receiving beacon signals from the same tracking tag. If so, these reader devices may communicate with one another in order to coordinate one or more of their duty cycles, scanning durations, and scanning times.

This coordination may involve the scheduling of duty cycles, scanning durations and scanning times. In this regard, the coordination may attempt to avoid the scanning time of one reader device overlapping at all or too much with the scanning time of another reader device. In other instances, the coordination may involve the scanning time of multiple reader devices overlapping. This can be useful in, for example, situations where the location of a beacon is to be determined by triangulating the signals received by multiple reader devices scanning simultaneously.

As noted above, in other approaches, the coordination of duty cycles may be determined by the server computing devices. For example, the server computing devices may determine that two reader devices are sending information for the same tracking tag, that a period of time has passed, that a tracking tag or reader device has moved and/or passed by a known fixed point that represents a high-traffic area, etc. If so, the server computing devices may attempt to coordinate the scheduling of duty cycles, scanning durations and scanning times of the reader devices, and send such information to the reader devices to affect the coordination and scheduling. In other instances, if information for a tracking tag indicates that the tracking tag is moving very quickly, the server computing devices may not want to attempt coordination since things are moving so quickly and frequently.

In this regard, information about the motion and activity of the reader devices may be sent to the server computing devices with the information from the beacon signals. As an example, this information may be as detailed as accelerometer data or a signal which indicates movement generated by a primitive shock sensor. In such instances, the server computing devices may factor this information in when coordinating and assigning duty cycles to the reader devices.

The approaches described above and herein, reader device to reader device coordination and server computing device, may be used in conjunction in a hybrid approach. Such an approach may therefore combine coordination between reader devices as well as coordination by the server computing devices to further improve the efficiency of the system. This may be especially useful in situations in which two reader devices are receiving beacon signals from the same tracking tag, but are not within the broadcast range of one another.

The features described herein may allow for the real-time coordination of duty cycles for reader devices used to localize and track objects. By doing so, the duty cycles of these reader devices may be better scheduled. In addition, scanning times during those duty cycles may be reduced while optimizing the likelihood that information about a tracked object is being provided to a server computing device and still maintaining the same visibility (or desired visibility requirement) of a tracked object. This, in turn, may even provide better coverage of objects in a system while also reducing power consumption of the system, and particularly at reader devices which are likely to be battery powered. In addition, this may reduce or even minimize the amount of information being sent over a network to server computing devices in order to facilitate the aforementioned localization and tracking as the coordination approaches described herein may also reduce redundant information being sent to and potentially stored by the server computing devices.

Example Systems

FIG. 1A illustrates examples of different objects in various environments. As shown on the left side image of the figure, there may be packages or equipment on a pallet in a warehouse. The pallet may have come off of a cargo truck as shown by the "In Transit" image in the middle of the figure. The pallet may be moved to one or more different locations within a warehouse, such as by the forklift shown in the left side image. The right-side image in the figure illustrates a situation where medical equipment (e.g., a wheelchair) and supplies in boxes may be stored in a supply room in a hospital.

In all of these situations—in the warehouse, on the cargo truck, or at the hospital, the objects of interest may move around. That may be to a different aisle or room in the warehouse, a different room (or even a different floor) of the hospital, or different part of the cargo container of the truck. In the latter case, the cargo may have shifted during transit or may have been repositioned as different packages were delivered to different locations. Knowing where the objects of interest are currently located, as opposed to where they are presumed to be based on an initial placement, is a valuable piece of information for an office manager, warehouse manager, nurse or orderly to have. Ideally, such people should be able to get the current location of a given object on their client computing device such as a laptop, mobile phone or smartwatch.

Figure 1B:
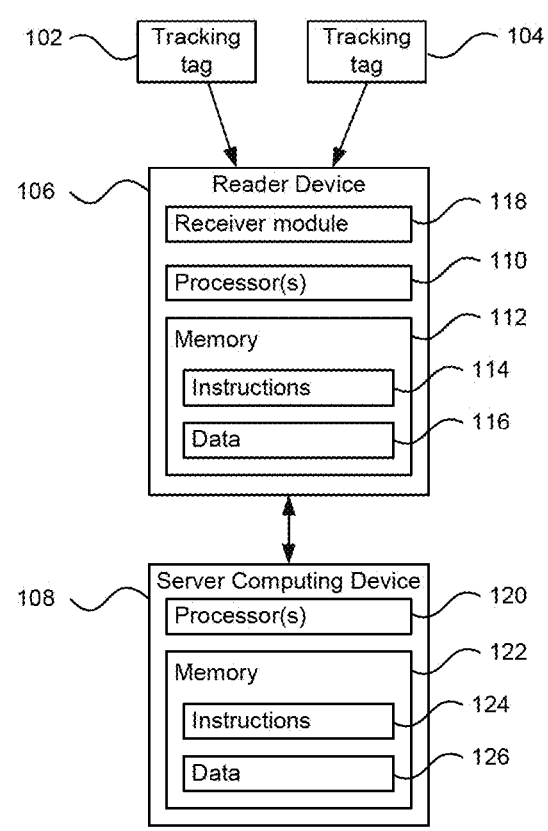
FIG. 1B is a functional diagram of an example tracking system in accordance with aspects of the disclosure.

FIG. 1B is a functional diagram of a tracking system 100. The tracking system 100 may include a plurality of tracking devices, such as tracking tags 102 and 104, and a reader device 106. As discussed further below, one or more server computing devices 108 may also be part of the tracking system 100. A given tracking tag may be placed on or otherwise attached to or inserted into an object to be tracked, such as a package, a piece of equipment, a vehicle, a warehouse section, a room, etc. While tracking tags 102 may be associated with objects such as packages, equipment or vehicles (e.g., a forklift or an autonomous fulfillment robot that can retrieve packages from different locations in a warehouse), tracking tags 104 may be fixed to an aisle in a warehouse or from a specific room in a hospital. Thus, different tracking tags may be used depending upon customer needs. As an example, different customers may have varying accuracy and "liveliness" needs. For instance, one customer may only want to know aisle-level accuracy every day (e.g., before a warehouse closes for the evening), while another customer such as a hospital nurse may need to know which room a piece of equipment is in every hour so that it can be accessed should a patient need such equipment. Each tracking tag 102 or 104 may emit an informational signal, for example a beacon signal, via an antenna, such as using the transmitting device, to communicate data. In this regard, each tracking tag may include an identifier chip (such as for radiofrequency (RF) identification) and/or a transmitting device (such as an RF module configured to transmit beacon signals using a selected frequency band and transmission protocol). In this regard, the beacon signals may simply transmit identifying information in order to enable tracking of objects in the case of tracking tags discussed further below. To facilitate this, each tracking tag may be embedded with a unique identifier, such as a unique MAC address or BLUETOOTH identifier, which may function as a tracking tag identifier. This tracking tag identifier may be assigned to the tracking tag during the manufacturing or provisioning processes (described further below).

The transmitting device of a tracking tag may send such information via radio frequency transmission in a selected frequency band, using a standard or proprietary protocol. By way of example, the transmitting device may employ a BLUETOOTH (e.g., a BLUETOOTH Low Energy (BLE)) or 802.11 protocol in the 2.4 GHz and/or 5 GHz frequency bands. In some examples, each beacon tracking tag and each tracking tag uses the BLUETOOTH or BLE protocol.

In some instances, the tracking tags may include one or more sensors. In such instances, the aforementioned communicated data may be formatted according to the selected protocol and include one or more sensed characteristics of the given tracking tag or its environment. For example, the sensed characteristic may be a temperature, a location, motion, battery conditions, trip conditions, and/or other detectable characteristics of the tracking devices or its environment.

The reader device 106 may be a computing device configured to detect the beacon signals emitted by the plurality of tracking tags 102 and 104, then store and/or transmit data related to the tracking tags. While only one reader is shown in FIG. 1B, the system may employ multiple readers. The reader device 106 may include one or more processors 110, memory 112 and other components typically present in general purpose computing devices. The reader device 106 includes a receive module 118 having an antenna and a processing section (not shown), which may include a bandpass filter for the frequency band of interest, an analog to digital (A/D) converter, and a signal processing module to evaluate information in received beacon signals. The processing section may also convert the received beacon signal to a baseband signal, before or after A/D conversion.

The one or more processors 110 may be any conventional processors, such as commercially available CPUs or microcontrollers. Alternatively, the one or more processors may be a dedicated device such as an ASIC or other hardware-based processor, such as a field programmable gate array (FPGA). Although FIG. 1B functionally illustrates the processor(s), memory, and other elements of the reader device 106 as being within the same block, the processor, computing device, or memory may actually include multiple processors, computing devices, or memories that may or may not be stored within the same physical housing. For example, memory may be a hard drive, a removable USB drive or other storage media located in a housing different from that of the reader device 106. Accordingly, references to a processor or computing device will be understood to include references to a collection of processors or computing devices or memories that may or may not operate in parallel.

The memory 112 stores information accessible by the one or more processors 110, including instructions 114 and data 116 that may be executed or otherwise used by the processor(s) 110. The data may include sensed characteristics from any of the tracking tags 102 and/or 104 received by the reader device 106. The memory 112 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 116 may be retrieved, stored or modified by processor(s) 110 in accordance with the instructions 114. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 114 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

In some implementations, the tracking system 100 may further include a central server, such as one or more server computing devices 108 accessible by the one or more processors 110 of the reader device 106. In some implementations, one or more tracking devices in the tracking system 100, such as a tracking tag 104, may be configured to obtain and communicate data directly to the one or more server computing devices 108. The one or more server computing devices 108 may include one or more processors 120, memory 122 and other components typically present in general purpose computing devices. The one or more processors 120 may be the same or similar type as the one or more processors 110, and the memory 122 may be the same or similar type as the memory 112. The memory 122 stores information accessible by the one or more processors 120, including instructions 124 and data 126 that may be executed or otherwise used by the processor(s) 120. Data 126 and instructions 124 may be the same or similar type as the data 116 and instructions 114, respectively.

After detecting the beacon signals of one or more tracking tags 102 or 104, the reader device 106 may transmit the data from the tracking tags to the one or more server computing devices 108 through an existing connection or through a network. Thus, in this case the reader device 106 may include a transmitter module (not shown) that is configured for wired or wireless transmission to the server computing device. The data may be received in a series of payloads (e.g., data packets) either continually, at one or more set intervals, or ad hoc whenever the tracking tags transmit. Thus, when there are multiple tracking tags, the data is effectively received as a plurality of separate data streams. A given payload (which may comprise one or more data packets) may include measurements taken at one or more time intervals, each of which may have a corresponding timestamp. In one scenario, the reader device 106 may include a transceiver including both a receiver and a transmitter, which is configured to receive beacon signals from the tracking tags 102 and 104 and also to send and receive information with the server computing device 108.

The server computing devices 108 may be configured to track characteristics of the tracking devices for one or more alerts based on a plurality of conditions. The plurality of conditions may include at least one condition for each characteristic, such as a minimum, a maximum, a threshold, a duration, or a geofence. The conditions may be predetermined or set based on user input. For example, a first alert may be set for when (1) a temperature is greater than, e.g., 0° C. to 10° C. for 30 minutes and (2) the tracking device is on a trip, which may indicate overheating of a cooled package or storage compartment. A second alert may be set for when (1) no motion is detected for 10 minutes, (2) 2 of 3 locations are in a geofence, and (3) the tracking device is on a trip, which may indicate that a package is out for delivery. A third alert may be set for when (1) a threshold amount of light is detected from inside a package and (2) the tracking device is on a trip, which may indicate unexpected opening of the package or tampering. A fourth alert may be set for when (1) a threshold amount of light is detected from inside a package and (2) 2 of 3 locations are in a destination geofence, which may indicate opening of the package after delivery or receipt. Many other alert conditions and tracking scenarios are possible, and the above examples are not intended to be limiting.

The tracking system 100 may optionally include an application that may be installed on one or more client computing devices. Using the application, the client computing devices may access the data from the reader device 106 and/or the server computing device 108 through a network.

Figure 2:
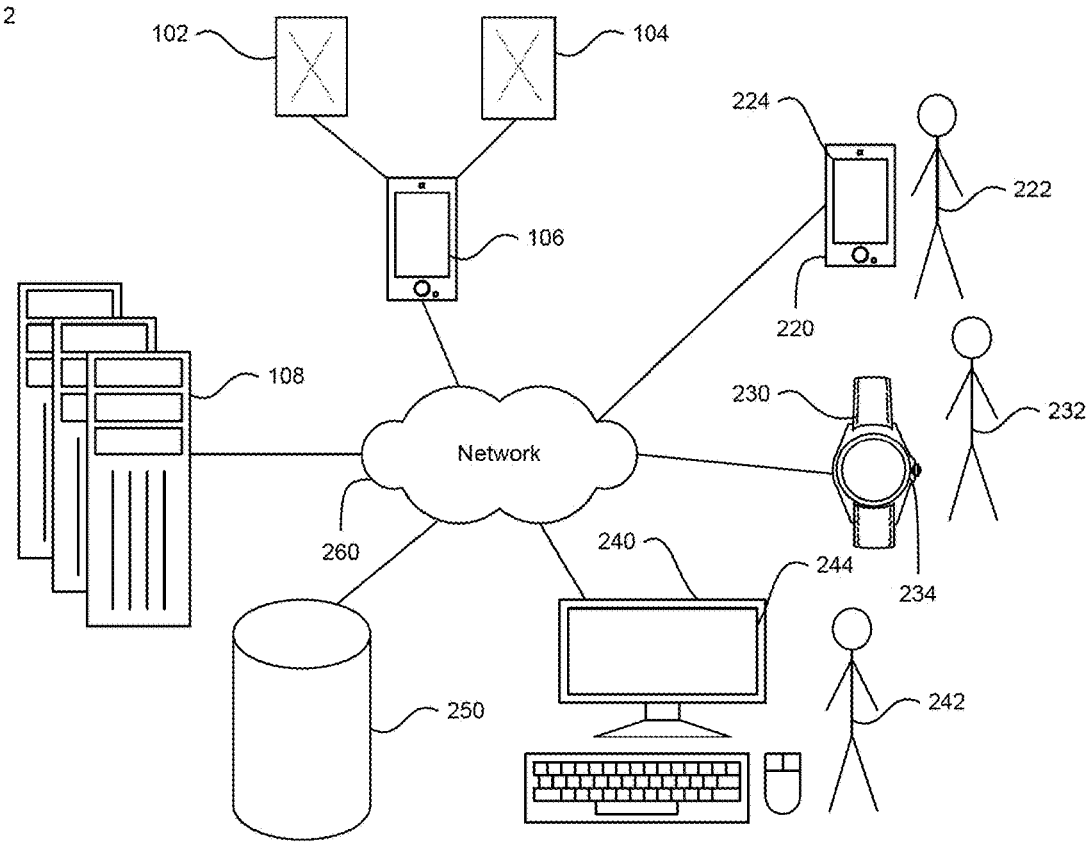
FIG. 2 is a pictorial diagram of an example network in accordance with aspects of the disclosure.
Figure 3:
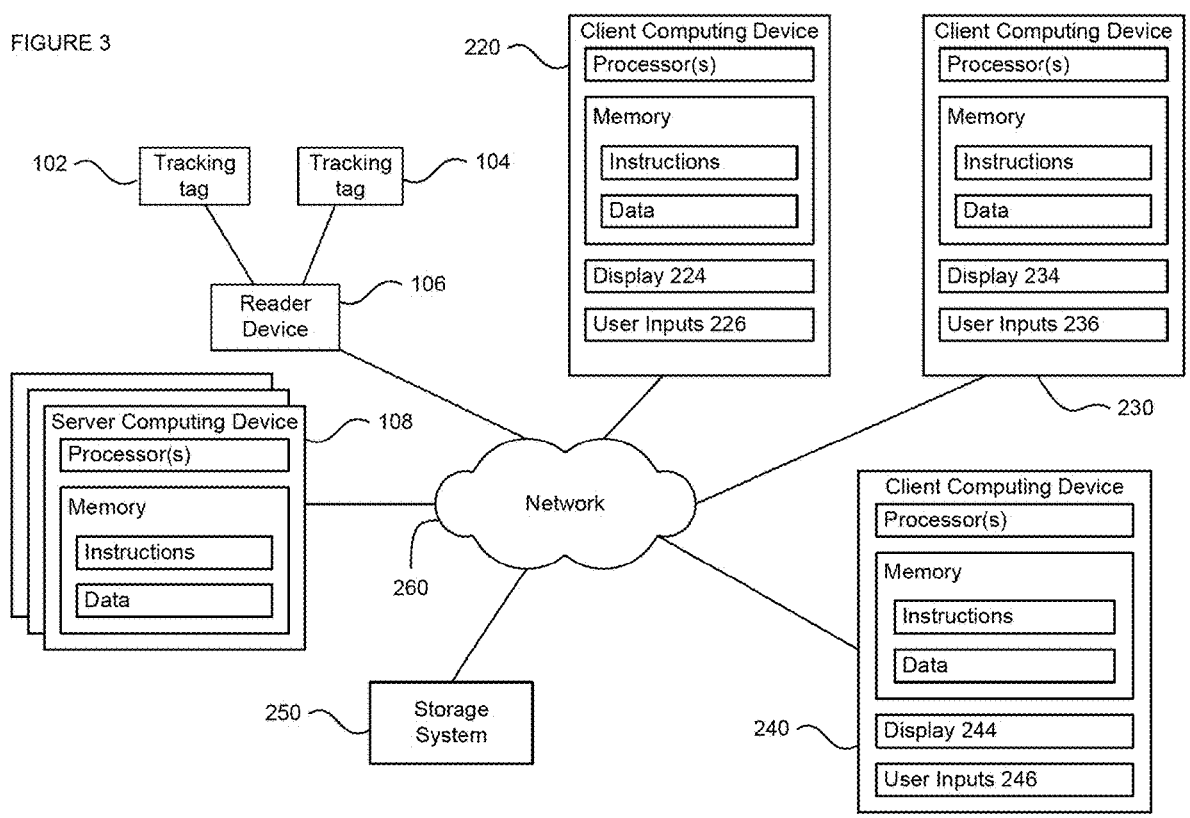
FIG. 3 is a functional diagram of the example network in FIG. 2 in accordance with aspects of the disclosure.

FIGS. 2 and 3 are pictorial and functional diagrams, respectively, of an example system 200 that includes a plurality of client computing devices 220, 230, 240 and a storage system 250 connected via a network 260. System 200 also includes tracking system 100, including tracking tags 102, 104, reader device 106, and server computing device 108. Although only a few tags and computing devices are depicted for simplicity, a typical system may include significantly more.

Using the client computing devices, users, such as user 222, 232, 242, may view the location data on a display, such as displays 224, 234, 244 of respective client computing devices 220, 230, 240. As shown in FIG. 3, each client computing device 220, 230, 240 may be a personal computing device intended for use by a respective user and have all of the components normally used in connection with a personal computing device including one or more processors (e.g., a central processing unit (CPU)), memory (e.g., RAM and internal hard drives) storing data and instructions, a display such as displays 224, 234, 244 (e.g., a monitor having a screen, a touch-screen, a head-mounted display, a smartwatch display, a projector, a television, or other device that is operable to display information), and user input devices 226, 236, 246 (e.g., one or more of a mouse, keyboard, touch screen and/or a microphone). The client computing devices may also include speakers, a network interface device, and all of the components used for connecting these elements to one another.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system (e.g., a smartwatch or head-mounted display, or a netbook that is capable of obtaining information via the Internet or other networks. As an example, the user may input information using a small keyboard, a keypad, microphone, using visual signals (gestures) with a camera or other sensor, or a touch screen.

As with memory 112, storage system 250 can be of any type of computerized storage capable of storing information accessible by the one or more server computing devices 108, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 260 as shown in FIG. 2, and/or may be directly connected to or incorporated into any of the client computing devices 220, 230, 240. The storage system 250 may store information about the tracking tags including, for example, location, status (e.g., activated and when), identifiers, last update, sensor data (e.g., temperature measurements), information about the object to which the tracking tag is attached (e.g., manufacturing data), and so on. In this regard, the information may be determined from received beacon signals provided to and updated at the storage system 250 by any of the one or more server computing devices 108 and/or client computing devices 220, 230, 240.

Figure 4A:
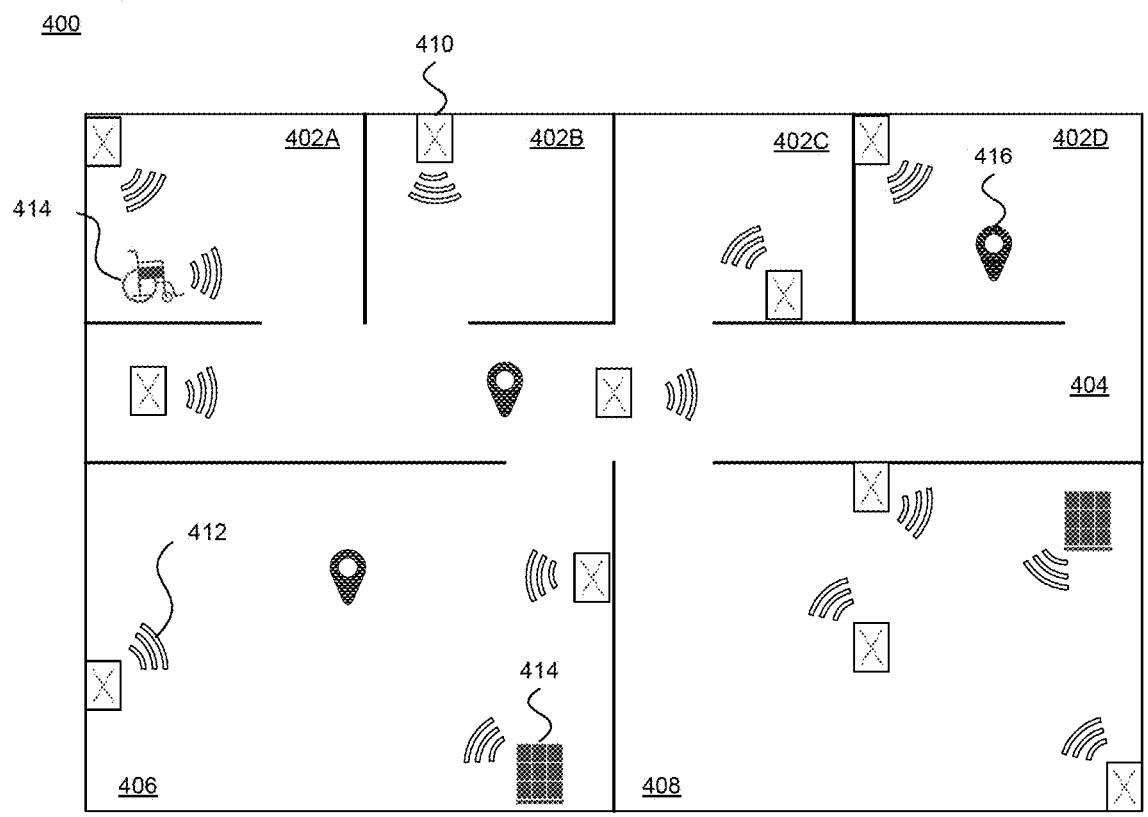
FIGS. 4A-B illustrate example scenarios in accordance with aspects of the disclosure.

FIG. 4A illustrates one example 400 of a system having a number of tracking tags arranged in various locations of a building (e.g., a hospital). In this example, there may be a number of rooms 402A, 402B, 402C, 402D, such as patient rooms, along one side of a hallway 404. On the opposite side of the hallway 404 there is a storage room 406, such as to house equipment or supplies, as well as another room 408, which may be a meeting room, common area, rehab facility or the like. One or more tracking tags 410 corresponding to the tracking tags 102 or 104 may be located in each room, including the hallway. Each tracking tag 410 may be fixed to a location in the rooms and configured to emit beacon signals 412 (e.g., RF signals in a selected frequency band according to a particular communication protocol). While the beacon signals 412 may appear directional, this need not be the case and the beacon signals may be transmitted omnidirectionally, for instance from a tracking tag 410 that is located on the ceiling, pillar or floor. In some implementations, the tracking tag 410 may be configured to emit beacon signals with information associated with its environment (e.g., temperature, humidity, etc.).

Tracking tags 414 may correspond to tracking tags 102 or 104 when placed on a variety of objects (e.g., a case of supplies as shown in storage room 406 or a wheelchair shown in room 402A). In some instances, the tracking tags may also be configured to emit beacon signals with information associated with the object on which the tracking tag is applied (e.g., temperature, motion information, object details, and/or other detectable characteristics of the tracking device or its environment). Reader devices 416 (which may be configured the same or similarly to reader device 106) may be found at various locations in the building, such as in a patient room, the storage room, the hallway or other location. Note that even if transmitted omnidirectionally, the beacon signals from a given tracking tag may be attenuated in a non-uniform manner due to the presence of walls, furniture, floors/ceilings, equipment, etc.

Figure 4B:
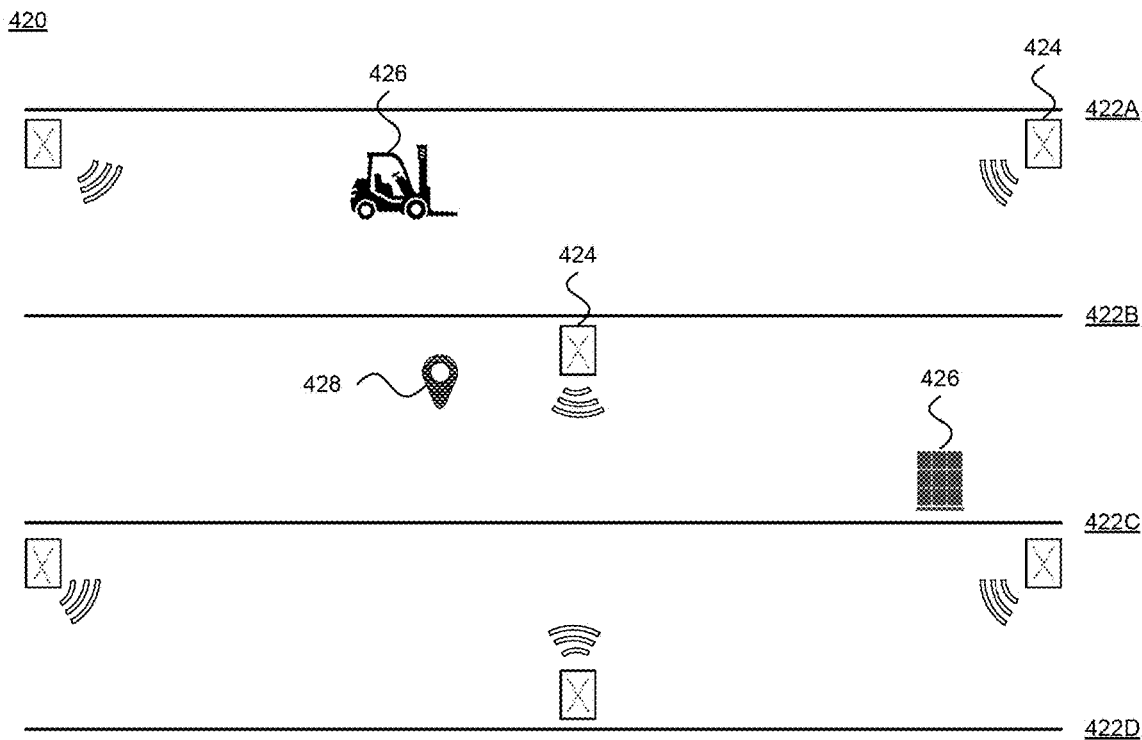

FIG. 4B illustrates another example 420 of a system having a number of fixed tracking tags positioned along different aisles in a warehouse setting. In this example, there are a number of aisles 422A, 422B, 422C, 422D, although there may be more (or fewer) aisles, and the aisles may be arranged in other configurations than what is shown. Here, fixed tracking tags 424 are located at different places for the aisles, such as along aisle end caps, along the ceiling (or floor), on shelves, storage lockers, cabinets or other places along the aisle, etc. Similar to FIG. 4A, fixed tracking tags 426 are placed on or otherwise associated with different objects, such as a pallet of equipment or a forklift that retrieves items from their locations in the warehouse. As above, the fixed tracking tags are configured to transmit beacon signals that are detectable by one or more reader devices 428 (which may be configured the same or similar to reader device 106).

Figure 5:
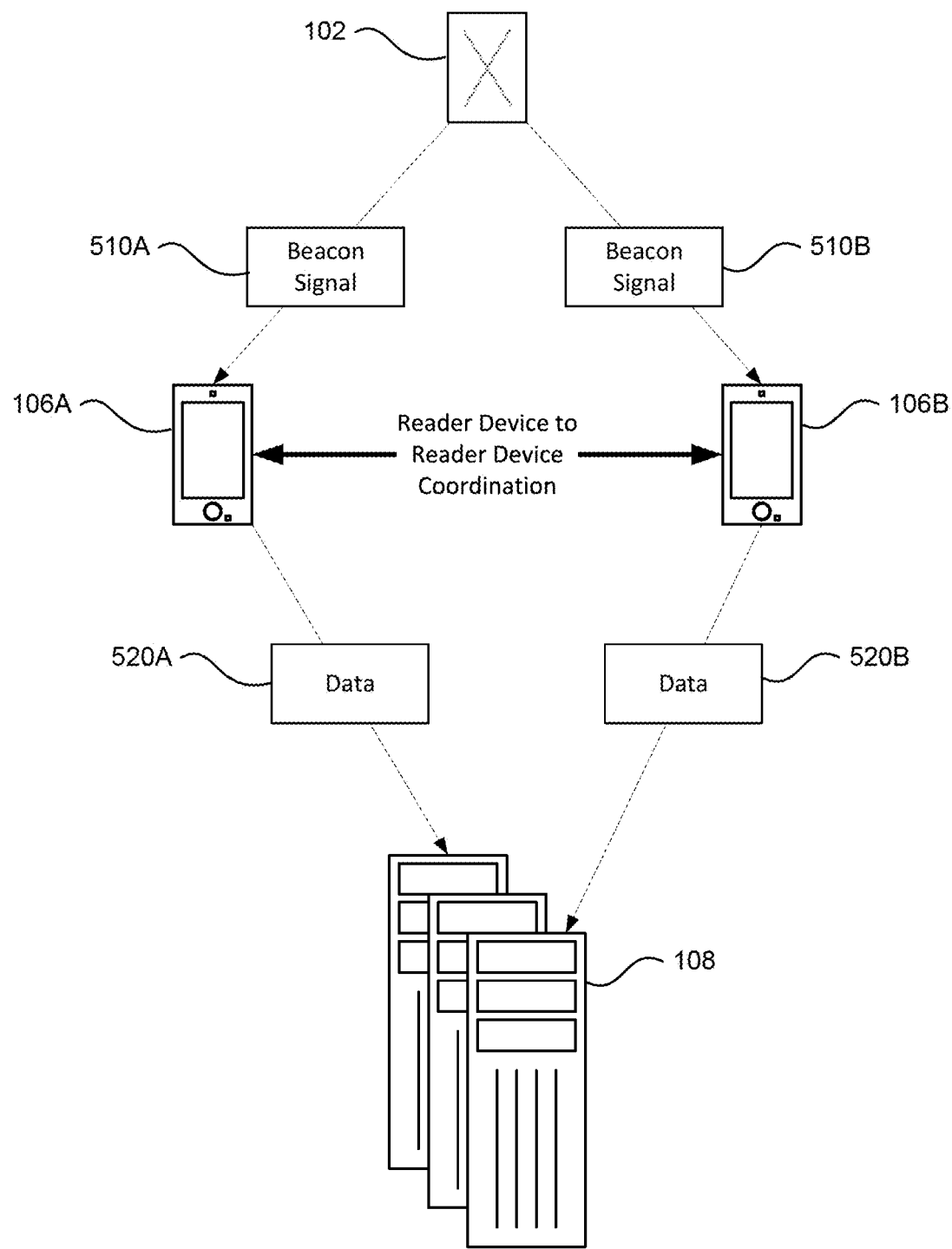
FIG. 5 is an example functional diagram of a tracking tag, reader devices, and server computing devices in accordance with aspects of the disclosure.

For example, referring to FIG. 5, tracking tag 102 may transmit beacon signals 510A, 510B which may be received by reader devices 106A, 106B (which may be configured the same or similarly to reader device 106). Each reader device in turn may transmit data 520A, 520B to the server computing device 108. As noted above, this data may provide information about the beacon signals 510A, 510B received from the tracking tag 102. Such information may include tracking tag identifiers, state information (e.g., whether or not the tracking tag has moved or is moving, temperature measurements, whether one or more thresholds have been met, etc.), etc. Thus, in this example, each of the reader devices 106A, 106B is within range of the tracking tag 102.

In order to determine the location of a given tracking tag, the system may use signal strength information obtained from the beacon signals of one or more tracking tags. A series of beacon signals may be ramped at different power levels (a ramped sequence). Evaluating the received beacon signals in view of their transmitted power can enable the system to determine which room or other location at which a given tracking tag is located. From that, the system is able to determine a location for a given tracking tag (and thus its corresponding object) with a suitable degree of certainty, such as by triangulating its position relative to the relevant tracking tags.

Example Methods

As noted above, a federated beacon scanning approach may be used to coordinate scheduling of duty cycles, scanning durations and scanning times. This may involve reader device to reader device coordination, coordination orchestrated by the aforementioned server computing devices, or a hybrid approach.

As noted above, the coordination of scheduling may be determined by two or more reader devices. For example, returning to FIG. 5, the reader devices 106A, 106B may communicate directly with one another, for instance using BLUETOOTH, BLUETOOTH LE, WiFi, or other communications protocols, in order to coordinate the scheduling of duty cycles, scanning durations and scanning times.

Figure 6:
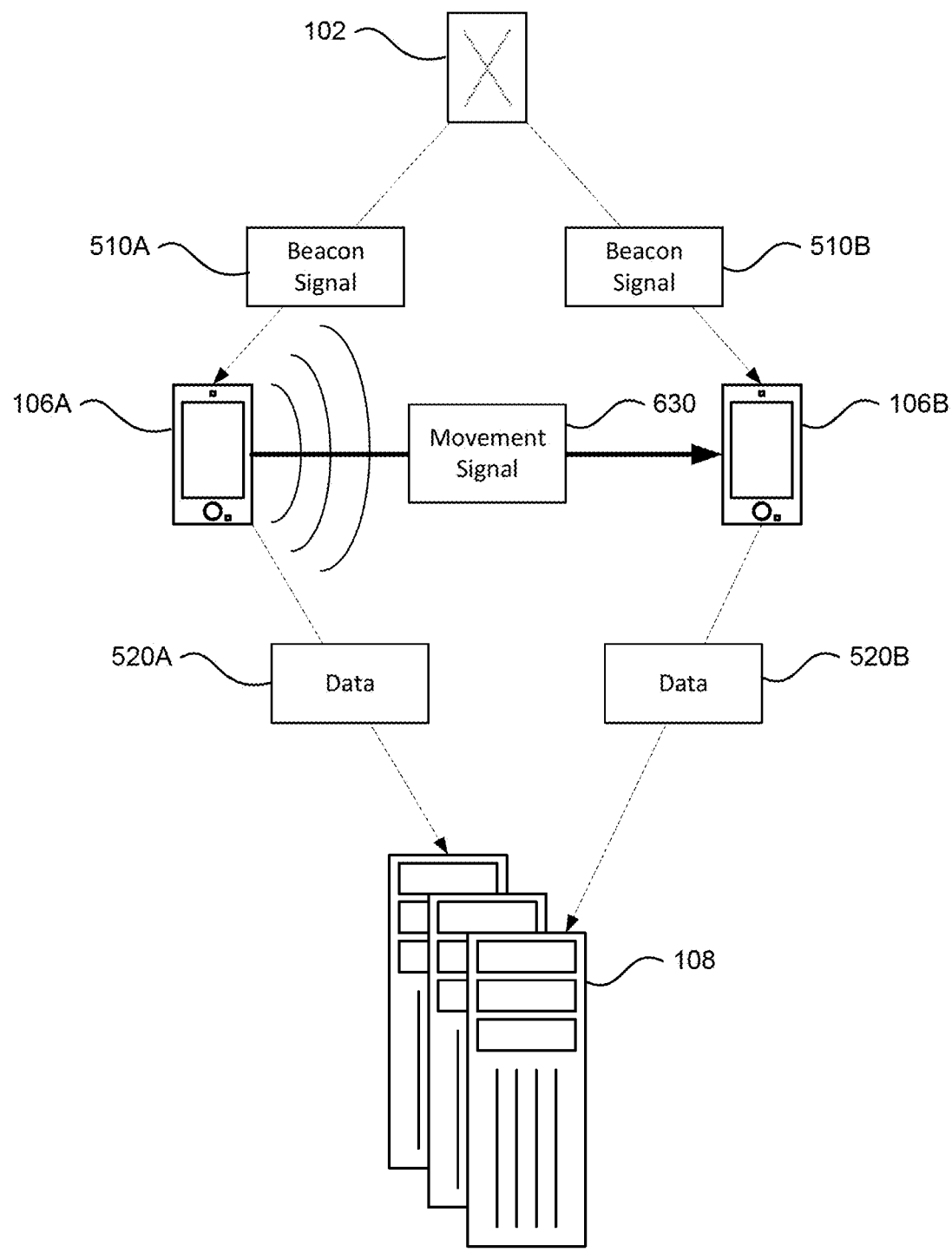
FIG. 6 is another example functional diagram of a tracking tag, reader devices, and server computing devices in accordance with aspects of the disclosure.

In one reader device to reader device coordination approach, two reader devices may be within range of one another or rather able to receive signals from one another. In such situations, the reader devices, such as reader device 106, may broadcast a first (e.g., BLUETOOTH, BLUETOOTH LE, WiFi, etc.) signal identifying whether that reader device has been moved. This signal may be used on accelerometer data or a signal which indicates movement generated by a primitive shock sensor. If so, other reader devices within range of the reading device that has moved may communicate with one another in order to coordinate one or more of their duty cycles, scanning durations, and scanning times. Turning to FIG. 6, reader device 106A may broadcast a signal 630 indicating that the reader device 106A has moved. In response, the reader devices 106A, 106B may coordinate the scheduling of duty cycles, scanning durations and scanning times as depicted in FIG. 5 and discussed further below.

Figure 7:
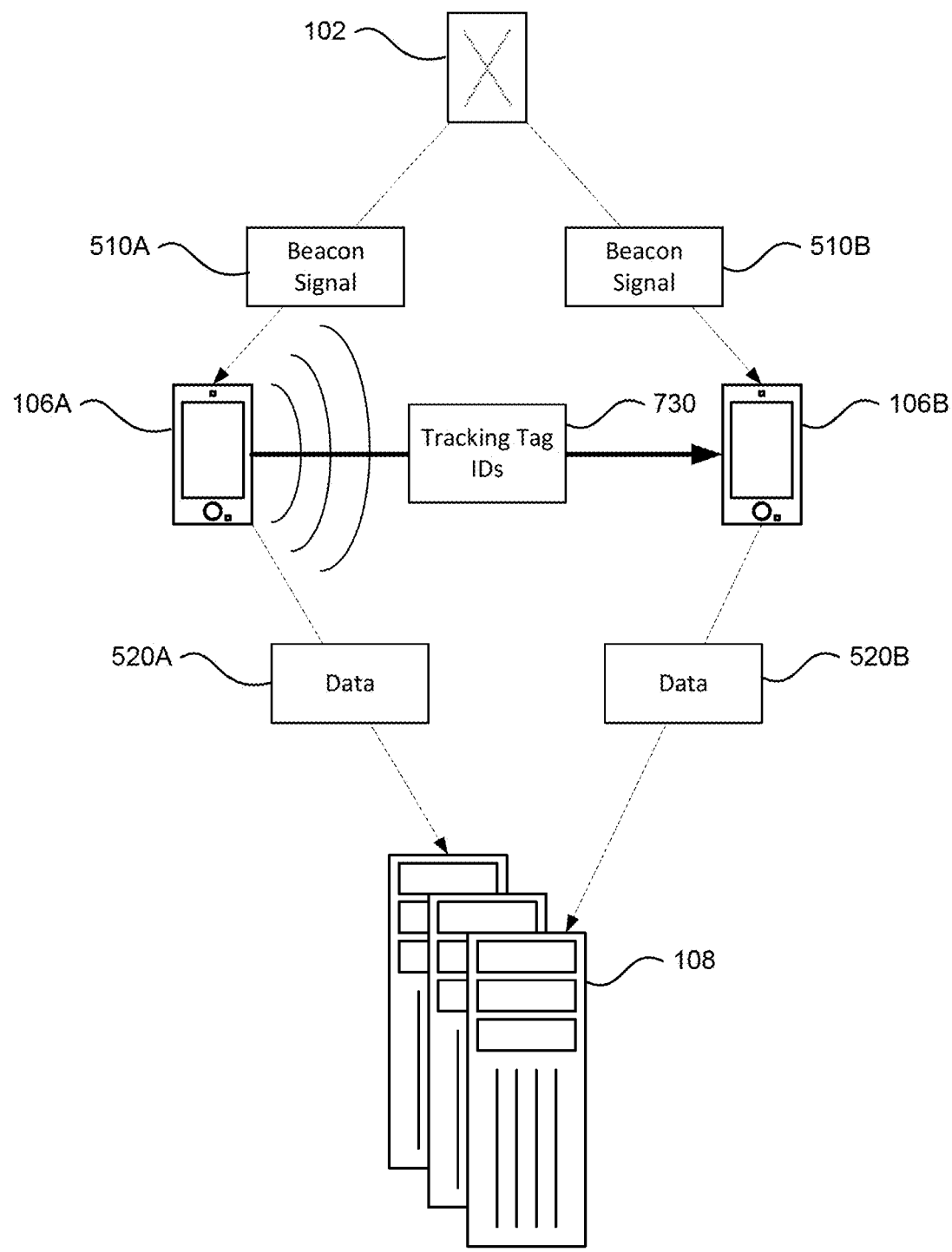
FIG. 7 is another example functional diagram of a tracking tag, reader devices, and server computing devices in accordance with aspects of the disclosure.

In another reader device to reader device approach, two reader devices may be scanning and receiving beacon signals from the same tracking tag. In such situations, the reader devices, such as reader device 106, may broadcast a second (e.g., BLUETOOTH, BLUETOOTH LE, WiFi, etc.) signal identifying which tracking tags are being received at that reader device. In this way, other reader devices nearby may determine if they are also receiving beacon signals from the same tracking tag. If so, these reader devices may communicate with one another in order to coordinate one or more of their duty cycles, scanning durations, and scanning times. Turning to FIG. 7, reader device 106A may broadcast a signal 730 identifying from which tracking tags the reader device 106A is receiving beacon signals. For instance, the signal 730 may identify the tracking tag identifier for the tracking tag 102. In response, the reader devices 106A, 106B may coordinate the scheduling of duty cycles, scanning durations and scanning times as depicted in FIG. 5 and discussed further below.

This coordination may involve the scheduling of duty cycles, scanning durations and scanning times. In this regard, the coordination may attempt to avoid the scanning time of one reader device overlapping at all or too much with the scanning time of another reader device. In other instances, the coordination may involve the scanning time of multiple reader devices overlapping. This can be useful in, for example, situations where the location of a beacon is to be determined by triangulating the signals received by multiple reader devices scanning simultaneously.

As noted above, tracking tags may be "paired" with objects to which the tracking tags will or are attached. Prior to this pairing (e.g., actual use), the tracking tags may be stored. Once paired with an object, the tracking tag may begin sending the aforementioned beacon signals and tracking of the object in the system may begin. In some instances, this may occur proximate to a reader device, such as reader device 106, such that the initial coordination of reader devices can begin with this information (e.g., with the information that a reader device is able to receive beacon signals from a particular tracking tag).

In order to facilitate the coordination, one reader device may be designated as the "coordinating reader device" using any number of approaches. This coordinating reader device may determine the scanning periods, scanning times and scanning durations of itself and at least one other reader device. In some instances, designating the coordinating reader device may be based on a prioritization scheme. In this regard, among two or more reader devices, the reader device having the highest priority may be designated the coordinating reader device. As an example, a line powered reader device may be prioritized over a battery powered reader device, reader devices that are least likely to move may be prioritized over those that are more likely to move (e.g., the reader device is a mobile device or another device that can provide information about when the reader device was last moved such as a flag), reader devices that are able to "hear" greater numbers of other reader devices may be prioritized over other reader devices that hear fewer numbers of other reader devices, and so on.

For the case of battery powered devices, reader devices with the lowest power consumption relative to battery capacity may be prioritized over reader devices with greater power consumption relative to battery capacity (e.g., this may be determined based on upload configuration, number of beacon signals received, etc.), that are able to "hear" greater numbers of other reader devices may be prioritized over other reader devices that hear fewer numbers of other reader devices, and reader devices that are not associated with a trip may be prioritized over reader devices that are associated with a trip (e.g., being transported from one location to another such as on a pallet, tractor-trailer, airplane, etc.). In this regard, these second signals may also indicate the type of the reader device which may be used to coordinate the scanning duty cycles between or among multiple reader devices. Examples of "type" of the device may include battery powered or line powered, gateway-only nodes (those that provide a backhaul to the server computing devices), mobile devices (such as phones or tablets), WI-FI access points with BLUETOOTH capabilities, relay notes (such as nodes which primary function is to store and forward information to other nodes such as the aforementioned gateway nodes), etc.

Figure 8:
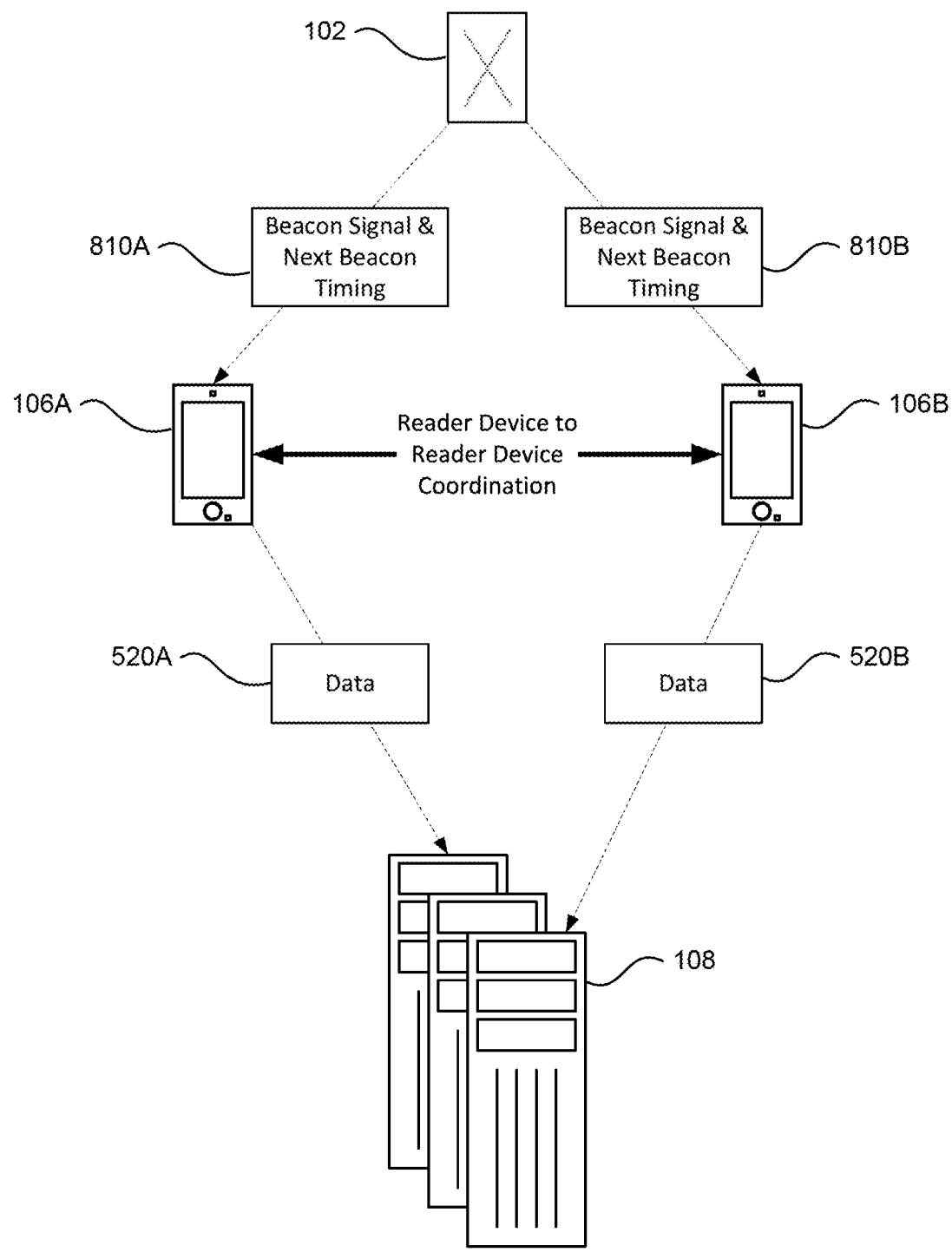
FIG. 8 is another example functional diagram of a tracking tag, reader devices, and server computing devices in accordance with aspects of the disclosure.

In some instances, the beacon signals may include information identifying the next transmission time. For example, the next transmission time may be defined based on the last transmission ("e.g., in 3 seconds") or in absolute time ("e.g., at 12:00:01"). This next transmission time may also be used by the coordinating reader device to coordinate the scanning duty cycles such that the scanning time is most likely to overlap with the next transmission time. Turning to FIG. 8, in addition to information included in the beacon signals 510A, 510B, the tracking tag 102 may also include information identifying the next transmission time in the beacon signals 810A, 810B. In this regard, this information may be received by the reader devices 106A, 106B. In response, the reader devices 106A, 106B may use this information to coordinate the scheduling of duty cycles, scanning durations and scanning times.

In some instances, when two or more reader devices which are scanning with lower duty cycles may schedule their respective duty cycles to eliminate or reduce overlap of scanning intervals and thereby effectively increase the scanning duty cycle for the system without increasing the power requirements of the reader devices and/or sending duplicate information to the server computing devices while ensuring a desired visibility requirement. For example, turning to FIGS. 9A and 9B, the tracking tag 102 may transmit beacon signals $B_1$, $B_2$, $B_3$, $B_4$, $B_5$, $B_6$, at a plurality of different times between time $T_0$ and time $T_1$. Here three reader devices, reader devices 106A, 106B, 106C (which may also be configured the same or similarly to reader device 106), are within range of the tracking tag 102. Each of these three reader devices has a respective scanning time represented by a bar. The scan durations, represented by the length of the bars, are the same, while the scanning times (e.g., start times) are different and the duty cycles may be different. In this example, the "low duty cycle" refers to the fact that the scanning times are smaller percentage of the overall duty cycles (e.g., 33%) and the overall scanning times are only 50% of the time between time $T_0$ and time $T_1$.

Figure 9A:
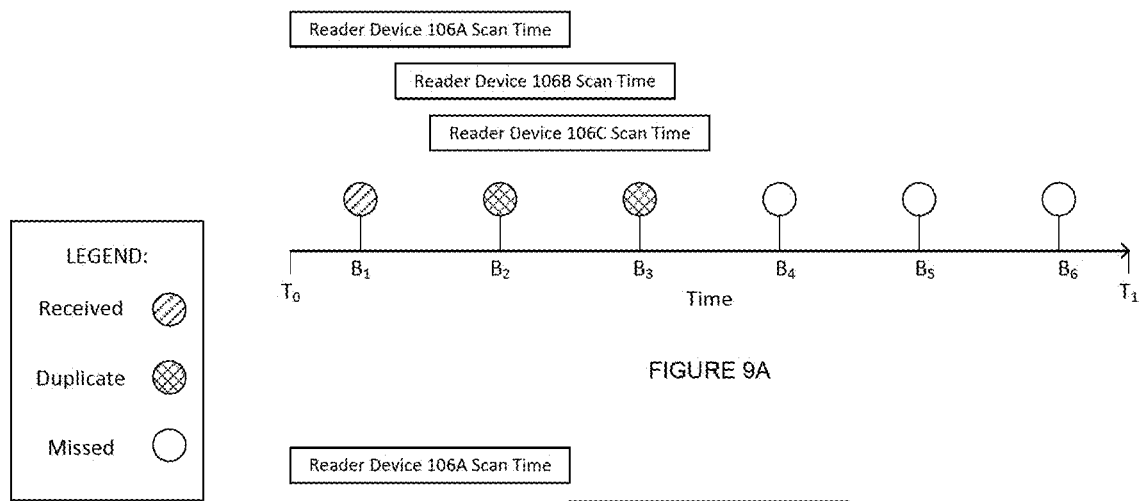
FIGS. 9A-9B are example representations of timing of beacon signals and scanning times in accordance with aspects of the disclosure.

In the example of FIG. 9A, the scan times of the three reader devices 106A, 106B, 106C partially overlap. As a result, beacon signal $B_1$ is received by the reader device 106A, beacon signal $B_2$ is received by the reader devices 106A, 106B, and 106C, beacon signal $B_3$ is received by the reader devices 106B and 106C, and beacon signals $B_4$, $B_5$, and $B_6$ are missed. As a result, the server computing devices 108 would receive duplicate data for beacon signals $B_2$ and $B_3$, and no data for beacon signals $B_4$, $B_5$, and $B_6$.

Figure 9B:
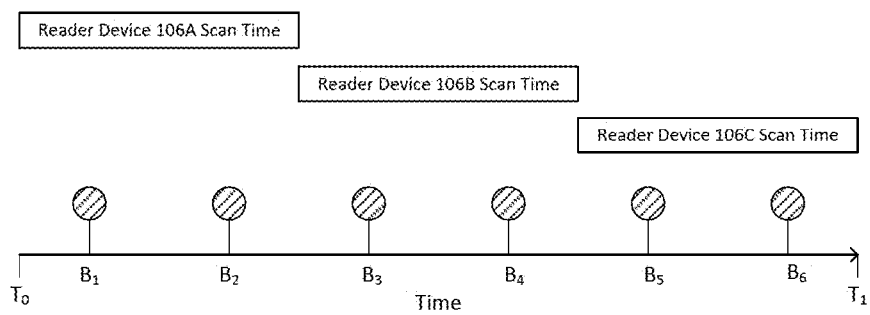

As depicted in FIG. 9B, by coordinating the scheduling of the duty cycles, scan durations, and scan times of reader devices 106A, 106B, 106C, the beacon signals $B_1$, $B_2$, $B_3$, $B_4$, $B_5$, $B_6$ may be received by at least one of the reader devices 106A, 106B, 106C and no beacon signals are missed. In this example, the duty cycle may be set to the amount of time between time $T_0$ and time $T_1$, and each of the scan durations to a fixed duration corresponding to the inverse of the number of reader devices involved in the coordination (e.g., ⅓ of the amount of time between time $T_0$ and time $T_1$). In addition, the start times of each of the reader devices may be staggered, such that the start time of reader device 106A is at the beginning of the duty cycle, the start time of reader device 106B is at the end of the scanning time of reader device 106A, and the start time of reader device 106C is at the end of the scanning time of reader device 106B. Thereafter, the duty cycle would repeat. Thus, without increasing the scan durations, the scanning time of the coordinated reader devices goes from 50% to 100% of the duty cycle. This coordination may thus improve the likelihood of each beacon signal being received by a reader device and thus, corresponding data sent to the server computing devices.

This sort of coordination may be used to make the scanning more efficient. However, as the number of tracking tags increases, transmissions of some of the beacon signals overlap and thus individual beacon signals may become difficult to hear so some overlap may be beneficial.

At the same time, when two or more reader devices which are scanning at higher duty cycles are in range of the beacon signals from the same tracking tag, these reader devices may schedule their respective duty cycles to minimize per reader power requirements (e.g., battery impact) and/or sending duplicate information to the server computing devices while ensuring a desired visibility requirement. For example, turning to FIGS. 10A and 10B, the tracking tag 102 may transmit beacon signals B1, B2, B3, B4, B5, B6, at a plurality of different times between time T0 and time T1. Here two reader devices, reader devices 106A, 106B, are within range of the tracking tag 102. Each of these reader devices has a respective scanning time represented by a bar. The scan durations, represented by the length of the bars, are the same, while the scanning times (e.g., start times) are different and the duty cycles may be different. In this example, the "high duty cycle" refers to the fact that the scanning times are a higher percentage of the overall duty cycles (e.g., 100%).

Figure 10A:
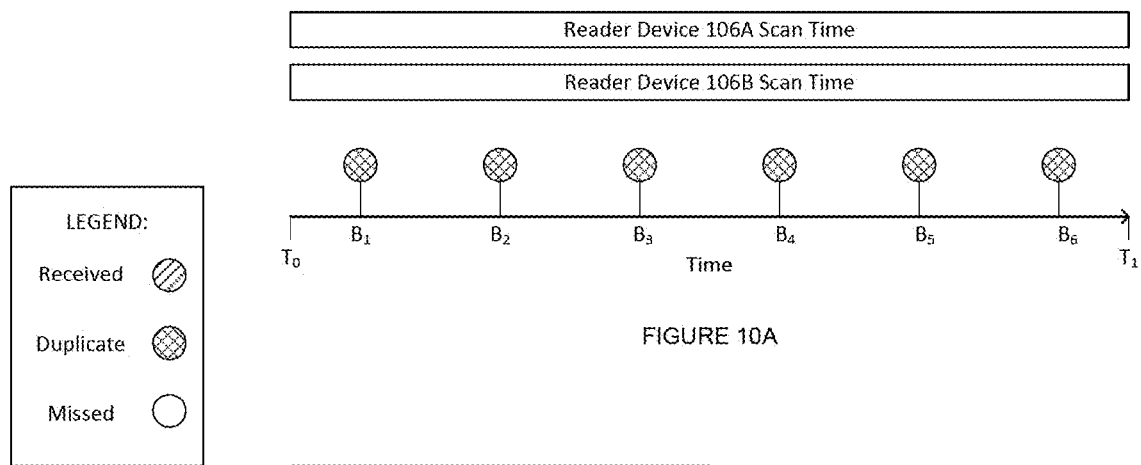
FIGS. 10A-10B are example representations of timing of beacon signals and scanning times in accordance with aspects of the disclosure.

In the example of FIG. 10A, the scan times of the reader devices 106A, 106B completely overlap. As a result, each of the beacon signals B1, B2, B3, B4, B5, B6 is received by both the reader device 106A and the reader device 106B. As a result, the server computing devices 108 would receive duplicate data for beacon signals B1, B2, B3, B4, B5, B6.

Figure 10B:
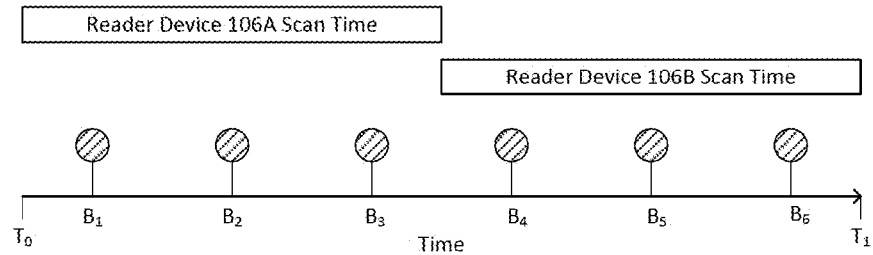

As depicted in FIG. 10B, by coordinating the scheduling of the duty cycles, scan durations, and scan times, the beacon signals B1, B2, B3, B4, B5, B6 may be received by at least one of the reader devices 106A, 106B and no beacon signals are missed. In this example, the duty cycle may be set to the amount of time between time T0 and time T1, and each of the scan durations to a fixed duration corresponding to the inverse of the number of reader devices involved in the coordination (e.g., ½ of the amount of time between time T0 and time T1). In addition, the start times of each of the reader devices may be staggered, such that the start time of reader device 106A is at the beginning of the duty cycle, and the start time of reader device 106B is at the end of the scanning time of reader device 106A. Thereafter, the duty cycle would repeat. Thus, while significantly decreasing the scan durations, the coordination may maintain the likelihood of each beacon signal being received by a reader device and reduce duplicate data sent to the server computing devices.

As another example, a visibility requirement may require that information for a given tracking tag must be received by the server computing devices every 5 min 99.999% of the time. For example, if two reader devices each scan at a 50% duty cycle (or half of the time), these reader devices may coordinate in order to each scan at only a 25% duty cycle and still maintain the same overall visibility of the tracking tag for the system while at the same time reducing the overall battery consumption per reader device per duty cycle.

Moreover, the greater the number of reader devices receiving beacon signals from the same tracking tag, the more likely the system is able to achieve a 100% or near 100% duty cycle by spreading the duty cycle across those reader devices. This, in turn, may further reduce battery consumption across those reader devices.

In other instances, a tracking tag may move out of or into range of a reader device. In such instances, the scheduling of duty cycles, scanning durations and scanning times may be updated. For instance, if two reader devices, R1 and R2, are able to receive beacon signals from a tracking tag T1 and R1 has a much larger battery capacity, the reader devices may coordinate the scan timing such that R1 scans 90% of the time (from 0:00-0:50 every minute) and R2 scan 10% of the time (from 0:50-0:59 every minute). After some amount of time, if T1 moves around such that only R2 is within range. In such a situation, there would be a much smaller change of the system receiving the beacon signals from T1 until R1 and R2 update the scheduling of duty cycles, scanning durations and scanning times to reflect that R1 is no longer in range and is no longer a viable reader device for tracking T1. Such situations may be addressed by automatically causing the reader devices to perform the reader device to reader device coordination periodically (e.g., every 15 minutes or more or less). Alternatively, such situations may be addressed by coordination by the server computing devices as discussed further below by automatically triggering the coordination in response to not receiving signals regarding T1 from R1 after some period of time.

In the case that one or more of the reader devices is a line powered reader device, the same approaches may be used in order to reduce the amount of duplicate information (i.e., information from the same tracking tag) being forwarded to the server computing devices. For example, line powered reader devices are typically stationary and thus, the server computing device may know their location with high confidence and can coordinate the scheduling of the duty cycles, scan durations, and scan times in order to reduce the battery drain for battery-powered reader devices. The server computing device may also reduce the amount of duplicate information by essentially instructing reader devices that are within range of particular tracking tags or locations to scan less frequently, since the line-powered reader devices may be able to scan continuously (or with a high duty cycle) without regard to battery drain. This may be especially relevant in situations in which a line-powered reader device can support a more powerful BLUETOOTH chip that will allow the reader device to receive BLUETOOTH signals from further away.

As noted above, in other approaches, the coordination of scheduling of duty cycles, scan durations and scan times may be determined by the server computing devices. For example, the server computing devices 108 may determine that two reader devices are sending information for the same tracking tag, that some particular circumstance has occurred, that a period of time has passed, that a tracking tag or reader device has moved (e.g. based on accelerometer, GPS or other location information), that a reader device and/or tracking tag has passed by a known fixed point that represents a high-traffic area (such as a loading dock). If so, the server computing devices 108 may attempt to coordinate the scheduling of duty cycles, scanning durations and scanning times of the reader devices as in the examples described above with respect to FIGS. 9A, 9B, 10A, 10B described above, and send such information to the reader devices to enable the coordination and scheduling and tracking of objects. In other instances, if information for a tracking tag indicates that the tracking tag is moving very quickly, the server computing devices 108 may not want to attempt coordination since things are moving so quickly and frequently.

Figure 11:
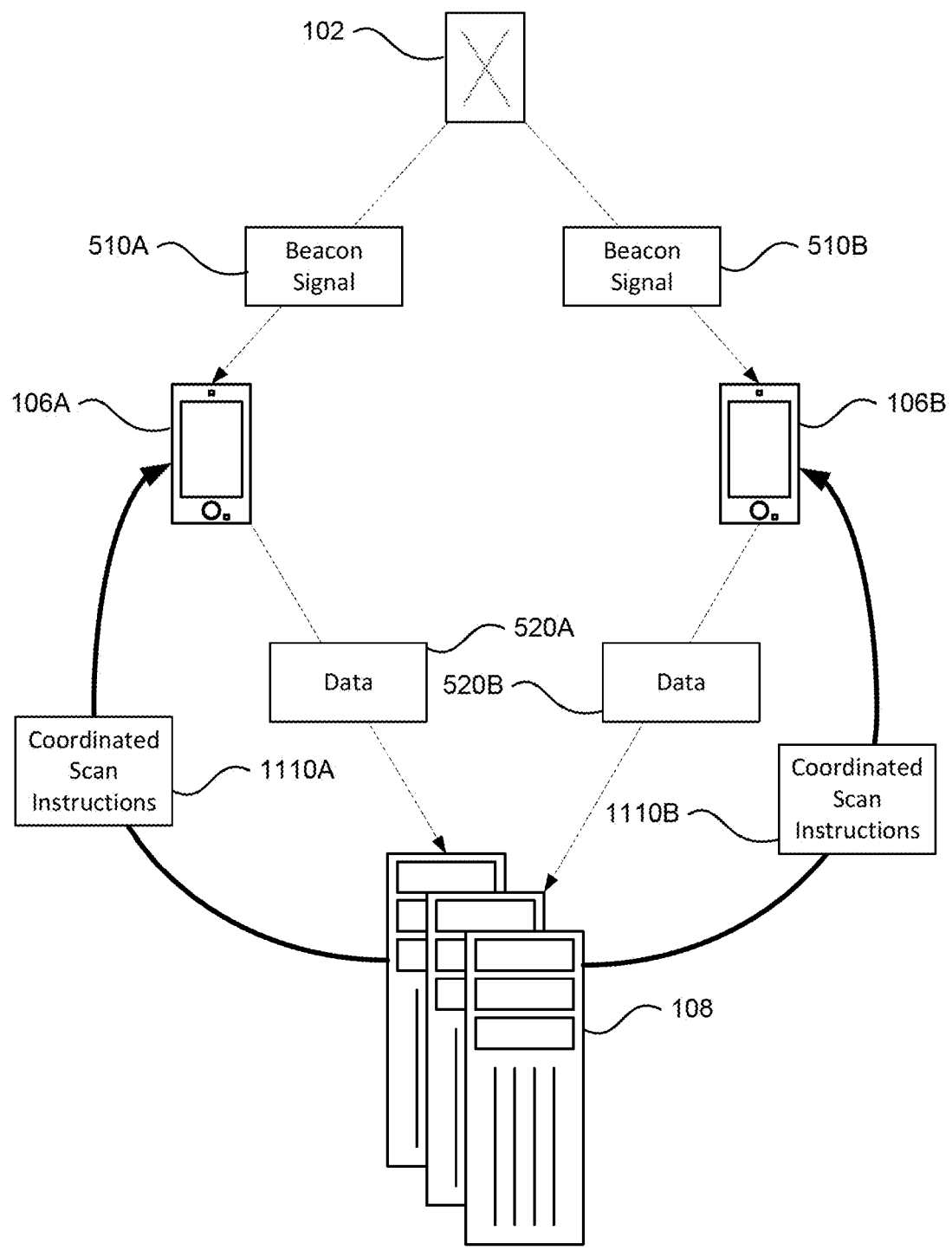
FIG. 11 is another example functional diagram of a tracking tag, reader devices, and server computing devices in accordance with aspects of the disclosure.

For example, referring to FIG. 11, tracking tag 102 may transmit beacon signals 510A, 510B which may be received by reader devices 106A, 106B (which may be configured the same or similarly to reader device 106). Each reader device in turn may transmit data 520A, 520B to the server computing device 108. As noted above, this data may provide information about the beacon signals 510A, 510B received from the tracking tag 102. Such information may include tracking tag identifiers, state information (e.g., whether or not the tracking tag has moved or is moving, temperature, etc.), etc. Thus, in this example, each of the reader devices 106A, 106B is within range of the tracking tag 102. In this example, the server computing devices may coordinate the scheduling of duty cycles, scan durations, and scan times, and may provide signals 1110A, 1110B to the reader devices 106A, 106B, respectively, identifying the respective coordinated duty cycles, scan durations and scan times. In this example, the server computing devices need not provide the reader device 106A with the coordinated duty cycle, scan duration and scan time for the reader device 106B, and vice versa.

Figure 15:
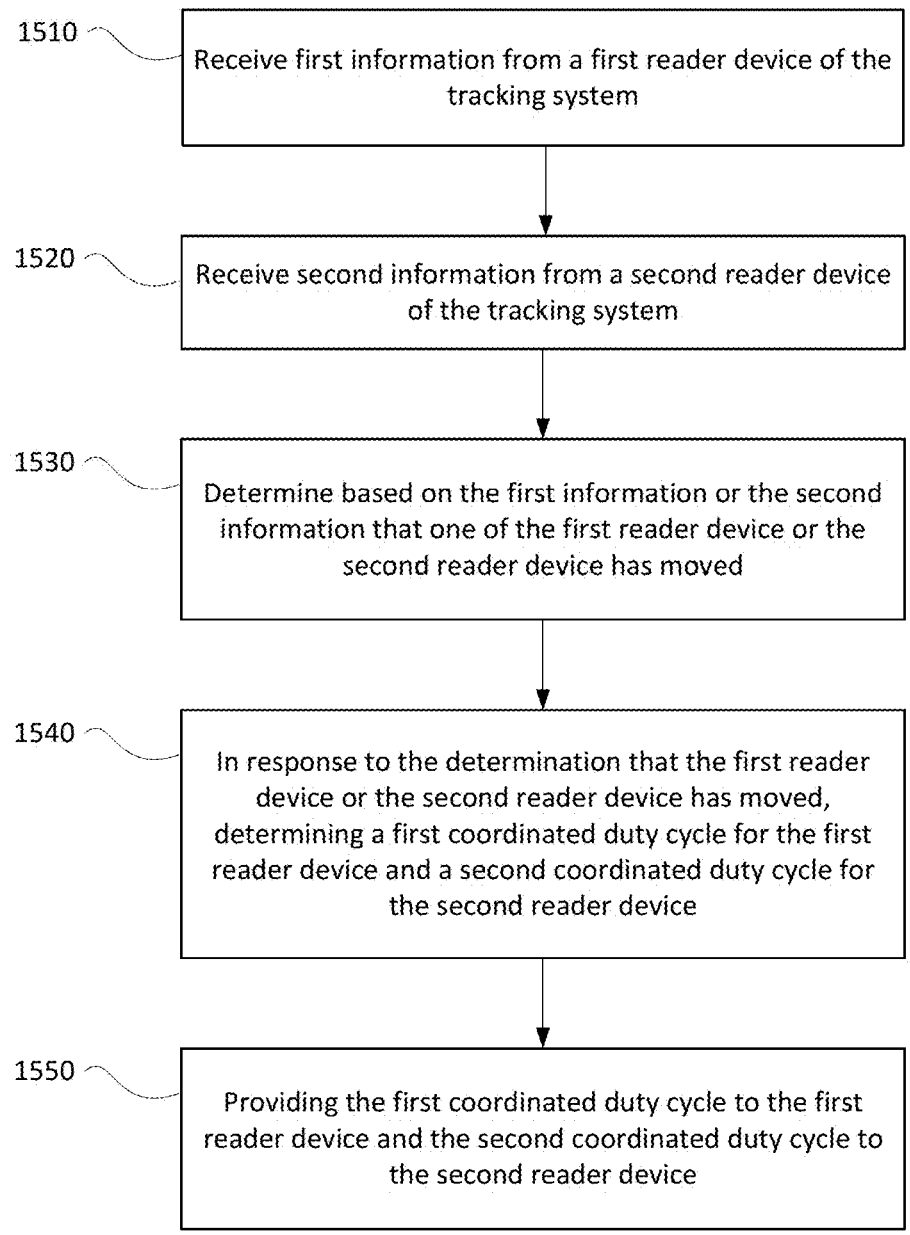
FIG. 15 is an example flow diagram in accordance with aspects of the disclosure.

FIG. 15 is a flow diagram 1500 for coordinating beacon signal scanning of reader devices in a tracking system which may be performed by one or more processors, such as the one or more processors of the server computing devices 108.

At block 1510, first information is received from a first reader device of the tracking system, and at block 1520, second information from a second reader device of the tracking system. As noted above, the reader devices may send various signals to the server computing devices 108. At least some of these signals may provide information about received beacon signals from tracking tags, and others of these signals may provide information about the motion and activity of a reader device that has been moved. In some instances, information about the motion and activity of the reader devices may be sent to the server computing devices 108 with the information from the beacon signals. As an example, this information about the motion and activity may be as detailed as accelerometer data or a signal which indicates movement generated by a primitive shock sensor. In some instances, as discussed further below, the server computing devices 108 may factor this information in when coordinating and assigning duty cycles to the reader devices.

Turning to block 1530, based on the first information or the second information, that one of the first reader device or the second reader device has moved is determined. At block 1540, in response to the determination that the first reader device or the second reader device has moved, a first coordinated duty cycle for the first reader device and a second coordinated duty cycle for the second reader device are determined. As noted above, determining the coordinated duty cycles may include scanning durations and scanning times as in the examples described above. Thus, the first coordinated duty cycle and second coordinated duty cycle may have scanning times that do not overlap, may be determined in order to reduce power consumption at the first reader device or the second reader device, and may be determined in order to reduce the scanning time of the first reader device and the second reader device. In addition, or alternatively, the server computing devices 108 may determine the coordinated schedules for reader devices if those reader devices are sending information for the same tracking tag, a period of time has passed (e.g., ever hour, every 15 hours or daily), that a tracking tag has passed by a known fixed point that represents a high-traffic area (such as a loading dock). Thereafter, at block 1550, the first coordinated duty cycle may be provided to the first reader device and the second coordinated duty cycle to the second reader device.

In some instances, the server computing devices may determine that some particular circumstance or event has occurred or is about to occur. For example, if truck arrives with 100 tracking tags which are to be unloaded into the warehouse, the server computing devices may automatically coordinate the scheduling of duty cycles, scan durations and scan times for a plurality of reader devices arranged within the warehouse, even before any tracking tags are present in the warehouse. In this case, the server computing devices may coordinate the scheduling of duty cycles, scanning durations and scanning times immediately before the truck is unloaded, so that the tracking system has maximum visibility when the tracking tags are unloaded. Waiting until one or more beacons are visible, the first few scans will likely be duplicative, miss data, or be inefficiently using power. In addition, in such instances, this coordination would be the server computing device's best guess at how to coordinate the reader devices as the server computing device may not have information such as the range of each reader device. In such cases, the server computing device may make an estimate based on previously collected data and/or machine learning models.

In other examples, as noted above, the server computing devices may automatically perform the coordination periodically or after a fixed period of time has passed. For example, this coordination may be performed every 5 minutes 10 minutes, hourly, daily, etc.

In some instances, the server computing devices may also do so in order to cause reader devices to scan more frequently during busy times (e.g., during business hours or between 9 am and 5 pm) and less frequently at off-hours (e.g. middle of the night) if such information is available for a given location or facility.

As noted above, in some instances, the beacon signals may include information identifying the next transmission time. In such instances, the reader devices may provide this information to the server computing devices 108 which, in turn, may use this information to coordinate the scanning duty cycles such that the scanning time is most likely to overlap with the next transmission time as described above. Thus, referring to block 1540 of FIG. 15, the first coordinated duty cycle and second coordinated duty cycle may be determined further based on the next transmission time of a particular tracking tag.

In some instances, the server computing devices 108 may use information about the motion of reader devices to coordinate the scheduling of duty cycles, scanning durations and scanning times of reader devices. For instance, the coordination may be based on the type of location to which a reader device is moved. Thus, referring to block 1540 of FIG. 15, the first coordinated duty cycle and second coordinated duty cycle may be determined further based on the motion of one of the first reader device or second reader device.

For example, the duty cycles of certain reader devices may be reduced when these reader devices enter a known "long-term storage" area in a warehouse. In addition, or alternatively, the duty cycles of reader devices may be increased when moved into a loading dock of a warehouse. The static location may be inferred using information from another a fixed reader device (e.g., a first reader device is fixed to the door of a loading dock, so if a second reader device receives signals from that first reader device, the location of the second reader device can be inferred to be near the loading dock) or specified ahead of time by a user (e.g., a user may provide location coordinate such as GPS coordinates of a long-term storage location). In other cases, the location could be a dynamic location such as when a reader device is determined to be near the drop-off location for an object with a tracking tag attached, the duty cycle of the reader device may be increased to ensure maximum visibility or meet chain-of-custody requirements.

In some instances, additional contextual information, such as lighting conditions, may be used to adjust the duty cycle of certain reader devices. For example, when a reader device detects an abrupt change to significantly lower lighting conditions (e.g., lights being shut off at the end of a work day in a storage area), the duty cycle of the reader device could be decreased. Similarly, when a reader device detects an abrupt change to significantly higher lighting conditions (e.g., lights being turned on at the beginning of a work day in a storage area). As another example, if a reader device is on a trip, and the server computing devices know that the reader device is located in the cargo area of a truck, the duty cycle could be increased as soon as a reader device detects an abrupt change to significantly higher lighting conditions, which may suggest that a door to the cargo area was opened as such a signal may indicate that movement of tracking tags and/or the reader device will soon occur. Of course, any of these examples could be used by the reader devices themselves (e.g., via reader device to reader device coordination) to adjust duty cycles.

In some instances, the location of the reader device which provides the information from the beacon signals of a tracking tag and the received signal strength indicator (RSSI) of those beacon signals may be used to infer movement of tracking tags. Thus, referring to block 1540 of FIG. 15, the first coordinated duty cycle and second coordinated duty cycle may be determined further based on the movement of a particular tracking tag.

This may help to improve the likelihood of the reader devices receiving information from a particular tracking tag and better triangulating the location of that tracking tag. For example, fixed or mobile reader devices located at or proximate to the exit of a room or building such as a warehouse (e.g., by a door) may be used to determine that a tracking tag is likely to be entering or exiting the room or building. In other words, signals identifying that certain tracking tags are moving in and out of range of such reader devices may indicate that these tracking tags are entering or exiting the room or building. This, in turn, may be used to generate alerts if, for example, the given tracking tag (or object to which the tracking tag is attached) is not supposed to enter or exit a given room or building. As such, the server computing devices 108 are able to increase the duty cycle of reader devices that are more likely to receive beacon signals from the tracking tag. For instance, the server computing devices 108 may change the duty cycles of reader devices within the building or outside of the building to increase the likelihood of receiving beacon signals from the tracking tag while at the same time preserving battery life.

For example, if a tracking tag is likely to be leaving the building, the scanning time of a duty cycle for a reader device located outside of the building (e.g., at a loading dock) may be increased in order to increase the likelihood that beacon signals from the tracking tag are received. The duty cycles may be further adjusted in real time in order to increase the likelihood of reader devices receiving beacon signals from the tracking tag until enough information is received to determine an accurate location. Once this occurs, the duty cycles may remain constant or may be adjusted downward to preserve power.

In other instances, the server computing devices 108 may use the information from the reader devices to determine whether a tracking tag is moving along in a particular direction (e.g., along a particular vector at a particular speed). If so, the server computing devices 108 may use this determination to coordinate the duty cycles or to modify the duty cycle of another nearby reader device. As noted above, this coordination of duty cycles may involve the scheduling of scanning times (i.e., the scanning time of one reader device should not overlap at all or too much with the scanning time of another reader device) as well as the length of scanning times within a duty cycle. Thus, referring to block 1540 FIG. 15, the first coordinated duty cycle and second coordinated duty cycle may be determined further based on the movement (e.g., speed and direction) of a particular tracking tag in a particular direction.

Figure 12:
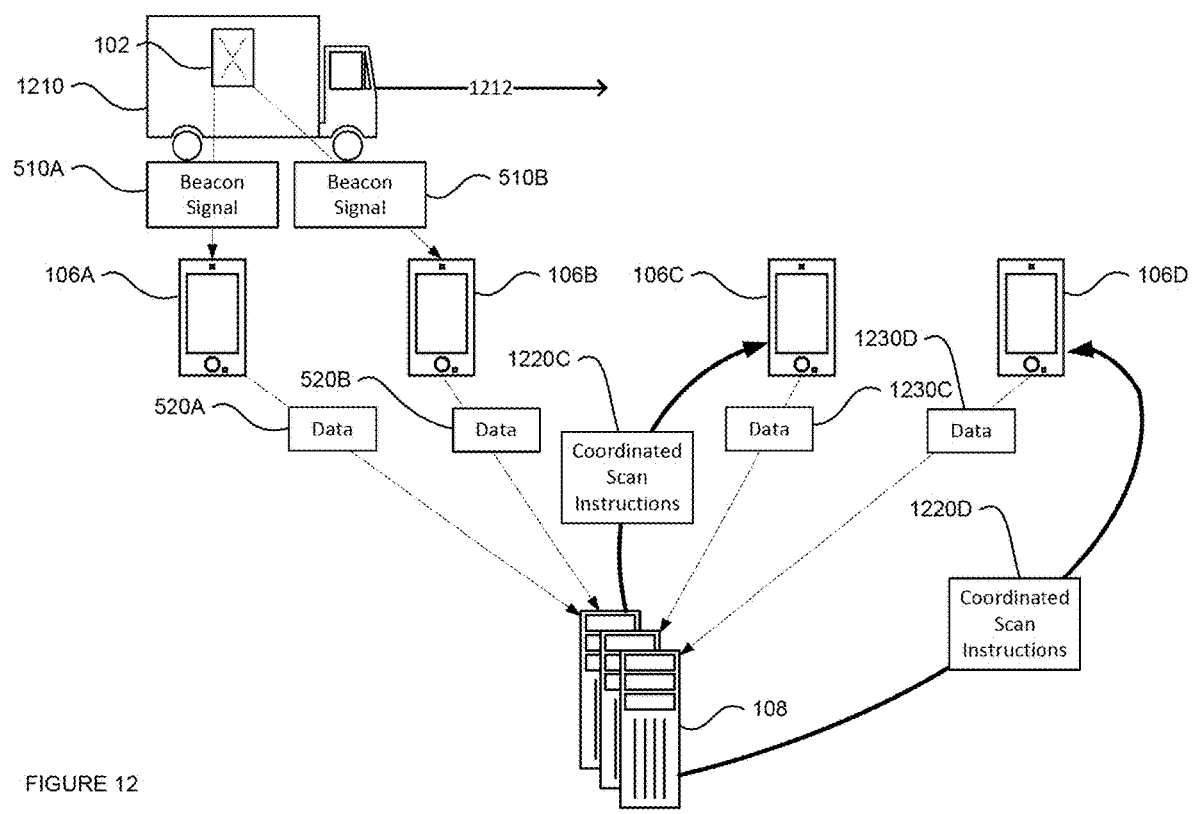
FIG. 12 is another example functional diagram of a tracking tag, reader devices, and server computing devices in accordance with aspects of the disclosure.

For example, as depicted in FIG. 12, the tracking tag 102 is located on an object within a vehicle 1210 traveling in a direction represented by arrow 1212. This direction may be determined by the server computing devices 108 based on the data 520A, 520B received from the reader devices 106A, 106B. Based on the direction and speed, the server computing devices may coordinate the scheduling of duty cycles, scan durations, and scan times of reader devices 106C and 106D (which may also be configured the same or similarly to reader device 106) such that reader devices 106C, 106D are most likely to receive beacon signals from the tracking tag 102 when the vehicle 1210 (and tracking tag 102) are passing or near the reader devices 106C,106D. The server computing devices 108 may provide signals 1220C, 1220D to the reader devices 106C, 106D respectively, identifying the respective coordinated duty cycles, scan durations and scan times. As noted above, this coordination may be based on the data 1230C, 1230D received from the reader devices 106C, 106D.

This coordination by the server computing devices approach may be especially useful in situations in which two reader devices are receiving beacon signals from the same tracking tag, but are not within the broadcast range of one another. In this regard, the reader devices are "hidden" from one another and therefore unable to coordinate duty cycles (e.g., "hidden node problem"). Moreover, it can be much more difficult to have the reader devices attempt to use predictive scan times based on tracking tag movement. However, because the server computing devices 108 are receiving information from each of these tracking tags indicating that the reader devices are both receiving beacon signals from the same tracking tag, the server computing devices 108 can coordinate the duty cycles as described above. This may also reduce the amount of information being sent to the server computing devices 108 for the same tracking tag.

Figure 13:
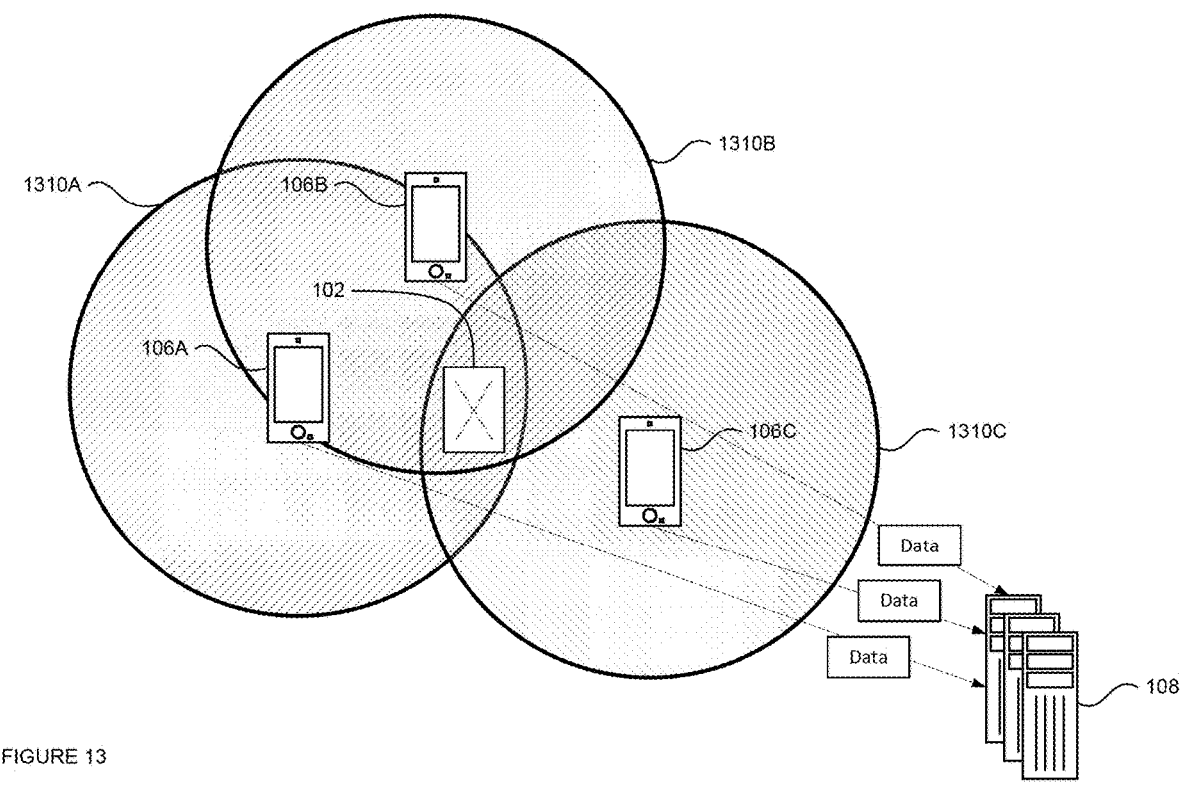
FIG. 13 is another example functional diagram of a tracking tag, reader devices, and server computing devices in accordance with aspects of the disclosure.

For example, as depicted in FIG. 13, each of the reader devices 106A, 106B, 106C has a respective range 1310A, 1310B, 1310C. This range defines the area within which the reader devices are able to send and receive broadcast signals (e.g., BLUETOOTH or BLUETOOTH LE signals). In this example, tracking tag 102 is located within range of all three of the reader devices 106A, 106B, 106C, and thus, each of the reader devices 106A, 106B, 106C may receive beacon signals from the tracking tag and send corresponding data to the server computing devices 108. However, in this example, while reader devices 106A and 106B are within range of one another, reader device 106C is not within range of reader device 106A or 106B. As such, reader device 106C is not able to "hear" broadcast signals sent by reader devices 106A or 106B and vice versa. Thus, reader device 106C is "hidden" from reader device 106A and 106B which would make reader device to reader device coordination among all the reader devices 106A, 106B, 106C infeasible. However, as noted above, in such situations, coordination by the server computing devices may be used to address such situations and coordinate the scheduling of duty cycles, scan durations and scan times (e.g., as depicted in FIGS. 11 and 12).

Figure 14:
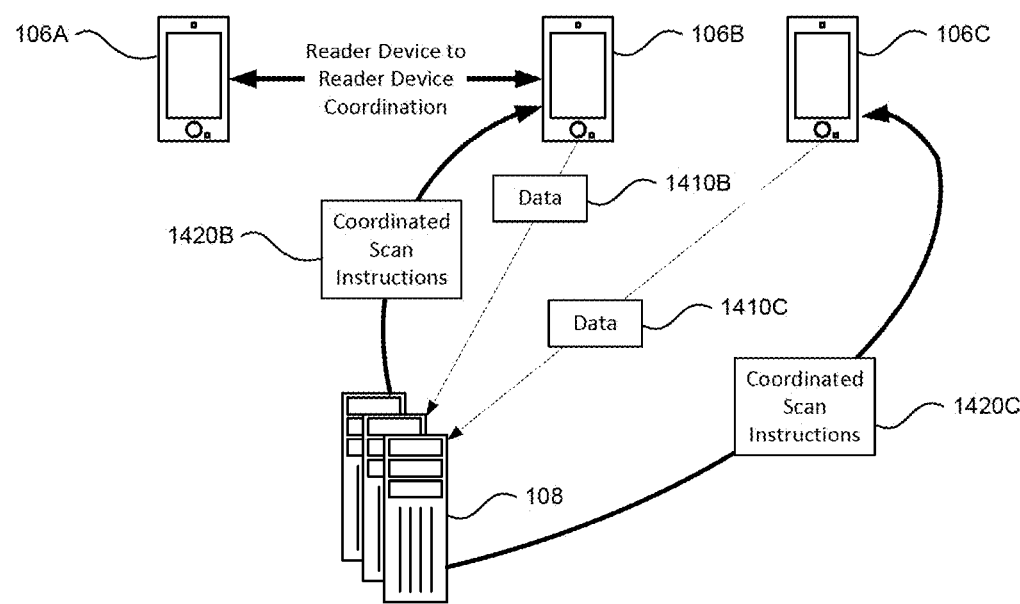
FIG. 14 is another example functional diagram of a tracking tag, reader devices, and server computing devices in accordance with aspects of the disclosure.

The approaches described above, reader device to reader device coordination and coordination by the server computing devices, may be used in conjunction in a hybrid approach. Such an approach may therefore combine coordination between reader devices as well as coordination by the server computing devices 108 to further improve the efficiency of the system. While the use of the server computing devices 108 to perform the coordination may address the hidden node problem discussed above and depicted in FIG. 13. At the same time, relying on the server computing devices 108 alone can be difficult to do in situations in which there are connectivity issues or rather, where the reader devices are unable to communicate with the server computing devices 108 for some reason. For example, as depicted in FIG. 14, reader device 106A may not currently be able to communicate with the server computing devices 108. Thus, the server computing devices 108 are only receiving data 1410B, 1410C from the reader devices 106B and 106C, respectively. Accordingly, the server computing devices 108 may coordinate the scheduling of the duty cycles, scan durations and scan times of reader devices 106B and 106C, and may provide signals 1420B, 1420C to the reader devices 106A, 106B, respectively, identifying the respective coordinated duty cycles, scan durations and scan times. Thus, having the reader device to reader device coordination, for example between reader devices 106A and 106B, can be used to bridge this gap in connectivity. In some instances, reader device 106B can leverage instructions from the server computing devices 108 when coordinating with the reader device 106A. In some instances, to reduce the number of network requests (and thus battery, latency, etc.), a single reader device could fetch the coordination info for all other reader devices within range and share those instructions. Moreover, using the server computing devices 108 for the coordination can also be more expensive in terms of power consumption at the reader devices because LTE and WI-FI typically require more power than BLUETOOTH or BLUETOOTH LE.

The features described herein may allow for the real-time coordination of duty cycles for reader devices used to localize and track objects. By doing so, the duty cycles of these reader devices may be better scheduled. In addition, scanning times during those duty cycles may be reduced while optimizing the likelihood that information about a tracked object is being provided to a server computing device and still maintaining the same visibility (or desired visibility requirement) of a tracked object. This, in turn, may even provide better coverage of objects in a system while also reducing power consumption of the system, and particularly at reader devices which are likely to be battery powered. In addition, this may reduce or even minimize the amount of information being sent over a network to server computing devices in order to facilitate the aforementioned localization and tracking as the coordination approaches described herein may also reduce redundant information being sent to and potentially stored by the server computing devices.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same as or similar elements.

The invention claimed is:

1. A method of coordinating beacon signal scanning of reader devices in a tracking system, the method comprising:
receiving, by one or more processors of one or more server computing devices, first information from a first reader device of the tracking system;
receiving, by the one or more processors, second information from a second reader device of the tracking system;

determining, by the one or more processors, based on the first information or the second information that one of the first reader device or the second reader device has moved;

in response to the determination that one of the first reader device or the second reader device has moved, determining, by the one or more processors, a first coordinated duty cycle for the first reader device and a second coordinated duty cycle for the second reader device, the first coordinated duty cycle including a first period during which the first reader device scans for beacon signals, the second coordinated duty cycle including a second period during which the second reader device scans for beacon signals; and providing, by the one or more server computing devices, the first coordinated duty cycle to the first reader device and the second coordinated duty cycle to the second reader device.

2. The method of claim 1, wherein the first period includes a scanning time that does not overlap with a scanning time of the second period.

3. The method of claim 1, wherein the first coordinated duty cycle for the first reader device is configured to reduce power consumption at the first reader device and the second coordinated duty cycle for the second reader device is configured to reduce power consumption at the second reader device.

4. The method of claim 1, wherein the first coordinated duty cycle for the first reader device reduces a scanning time of the first reader device, and the second coordinated duty cycle for the second reader device reduces a scanning time of the second reader device.

5. The method of claim 1, wherein the first information or the second information indicates a next transmission time of a tracking tag, and wherein determining the first coordinated duty cycle for the first reader device and the second coordinated duty cycle for the second reader device is further based on the next transmission time.

6. The method of claim 1, wherein the first information further includes information about motion of the first reader device, and wherein determining the first coordinated duty cycle for the first reader device and the second coordinated duty cycle for the second reader device is further based on the motion.

7. The method of claim 1, further comprising, using the first information and the second information to determine that a tracking tag has moved, and wherein determining the first coordinated duty cycle for the first reader device and the second coordinated duty cycle for the second reader device is further based on the determination that the tracking tag has moved.

8. The method of claim 1, further comprising, using the first information and the second information to determine that a tracking tag is moving in a particular direction, and wherein determining the first coordinated duty cycle for the first reader device and the second coordinated duty cycle for the second reader device is further based on the particular direction.

9. The method of claim 1, further comprising, determining, by the one or more processors, a third coordinated duty cycle for a third reader device in conjunction with the determining of the first coordinated duty cycle and the second coordinated duty cycle.

10. A system for coordinating beacon signal scanning of reader devices in a tracking system, the system comprising one or more server computing devices having one or more processors configured to:

receive first information from a first reader device of the tracking system;

receive second information from a second reader device of the tracking system;

determine based on the first information or the second information that one of the first reader device or the second reader device has moved;

in response to the determination that one of the first reader device or the second reader device has moved, determine a first coordinated duty cycle for the first reader device and a second coordinated duty cycle for the second reader device, the first coordinated duty cycle including a first period during which the first reader device scans for beacon signals, the second coordinated duty cycle including a second period during which the second reader device scans for beacon signal; and provide the first coordinated duty cycle to the first reader device and the second coordinated duty cycle to the second reader device.

11. The system of claim 10 further comprising, the first reader device and the second reader device.

12. The system of claim 10, wherein the first period has a scanning time that does not overlap with a scanning time of the second period.

13. The system of claim 10, wherein the first coordinated duty cycle for the first reader device is configured to reduce power consumption at the first reader device and the second coordinated duty cycle for the second reader device is configured to reduce power consumption at the second reader device.

14. The system of claim 10, wherein the first coordinated duty cycle for the first reader device reduces a scanning time of the first reader device, and the second coordinated duty cycle for the second reader device reduces a scanning time of the second reader device.

15. The system of claim 10, wherein the first information or the second information indicates a next transmission time of a tracking tag, and wherein the one or more processors are further configured to determine the first coordinated duty cycle for the first reader device and the second coordinated duty cycle for the second reader device further based on the next transmission time.

16. The system of claim 15, further comprising the tracking tag.

17. The system of claim 10, wherein the first information further includes information about motion of the first reader device, and wherein the one or more processors are further configured to determine the first coordinated duty cycle for the first reader device and the second coordinated duty cycle for the second reader device further based on the motion.

18. The system of claim 10, wherein the one or more processors are further configured to use the first information and the second information to determine that a tracking tag has moved, and to determine the first coordinated duty cycle for the first reader device and the second coordinated duty cycle for the second reader device further based on the determination that the tracking tag has moved.

19. The system of claim 10, wherein the one or more processors are further configured to use the first information and the second information to determine that a tracking tag is moving in a particular direction, and to determine the first coordinated duty cycle for the first reader device and the second coordinated duty cycle for the second reader device further based on the particular direction.

20. The system of claim 10, wherein the one or more processors are further configured to determine a third coordinated duty cycle for a third reader device in conjunction with the determining of the first coordinated duty cycle and the second coordinated duty cycle.

* * * * *